(12) United States Patent
Anderson et al.

(10) Patent No.: US 6,987,144 B2
(45) Date of Patent: Jan. 17, 2006

(54) FLEXIBLE COATING COMPOSITIONS HAVING IMPROVED SCRATCH RESISTANCE, COATED SUBSTRATES AND METHODS RELATED THERETO

(75) Inventors: Lawrence G. Anderson, Pittsburgh, PA (US); Shawn A. De Saw, McMurray, PA (US); Marvis E. Hartman, Pittsburgh, PA (US); Deborah E. Hayes, Verona, PA (US); Thomas R. Hockswender, Gibsonia, PA (US); Kymarie L. Kuster, Pittsburgh, PA (US); Michael Allen Mayo, Pittsburgh, PA (US); Masayuki Nakajima, Wexford, PA (US); Kurt G. Olson, Gibsonia, PA (US); Richard J. Sadvary, Pittsburgh, PA (US); Laura E. Schilling, Pittsburgh, PA (US); Dennis A. Simpson, Pittsburgh, PA (US); Shiryn Tyebjee, Allison Park, PA (US); Truman F. Wilt, Clinton, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 118 days.

(21) Appl. No.: 10/456,576

(22) Filed: Jun. 9, 2003

(65) Prior Publication Data

US 2004/0110895 A1 Jun. 10, 2004

Related U.S. Application Data

(60) Division of application No. 09/629,420, filed on Jul. 31, 2000, now Pat. No. 6,610,777, which is a continuation-in-part of application No. 09/489,042, filed on Jan. 21, 2000, now abandoned, which is a continuation-in-part of application No. 09/489,043, filed on Jan. 21, 2000, now abandoned, and application No. 09/489,043, and application No. 09/489,042, which is a continuation-in-part of application No. 09/365,069, filed on Jul. 30, 1999, now abandoned.

(60) Provisional application No. 60/171,898, filed on Dec. 23, 1999, and provisional application No. 60/171,899, filed on Dec. 23, 1999.

(51) Int. Cl.
*C08L 83/04* (2006.01)
*C08L 83/06* (2006.01)
*C08L 83/08* (2006.01)

(52) U.S. Cl. .................. 524/588; 525/100; 525/102; 525/474; 525/476; 528/26; 528/28; 528/29

(58) Field of Classification Search .................. 524/588; 525/100, 102, 474, 476; 528/26, 28, 29
See application file for complete search history.

(56) References Cited

U.S. PATENT DOCUMENTS 1,873,945 A    8/1932   Kraenzlein et al.
2,584,340 A    2/1952   Goodwin et al.
2,587,295 A    2/1952   Doyle et al.
2,860,074 A   11/1958   Hedlund et al.
2,901,449 A    8/1959   Schwarz et al.
2,978,437 A    4/1961   Christenson
3,203,919 A    8/1965   Brachman
3,317,460 A    5/1967   Clark (Continued)

FOREIGN PATENT DOCUMENTS

| DE | 1193504     | 5/1965  |
|----|-------------|---------|
| DE | 1545040     | 7/1970  |
| DE | 2205570     | 12/1988 |
| DE | 44 32 260   | 6/1995  |
| DE | 197 09 467  | 3/1997  |
| EP | 0010555     | 5/1980  |
| EP | 0088193     | 9/1983  |
| EP | 0139187     | 5/1985  |

(Continued)

OTHER PUBLICATIONS

Office Action of U.S. Appl. No. 09/629,422, filed Oct. 26, 2004.
Office Action of U.S. Appl. No. 10/642,826, filed Oct. 22, 2004.
Office Action of U.S. Appl. No. 10/795,216, filed Dec. 15, 2004.
Office Action of U.S. Appl. No. 10/784,830, filed Dec. 15, 2004.
Iler, Ralph K., "The Chemistry of Silica", Colloidal Silica-Concentrated Sols, 1979, pp. 412–414.
Verboom et al., "N, N'-Bis[trismethylsilyl]–urea: A Useful Silylating Agent for Alcohols and Carboxylic Acids", Laboratory of Organic Chemistry, Twente University of Technology, Enschede, The Netherlands, Communications, pp. 807–809, Oct. 1981.
"Surface Coatings—vol. 1: Raw Materials and Their Usage," $2^{nd}$ Ed., Tafe Educational Books, New South Wales University Press Limited, New South Wales, Australia 1983.
Chattha et al., "High Solids Coatings from New Oligomers", Journal of Coatings Technology, vol. 55, No. 700, pp. 39–46, May 1983.

(Continued)

Primary Examiner—Caixia Lu
(74) Attorney, Agent, or Firm—Deborah M. Altman

(57) ABSTRACT

Coating compositions are provided which include a polysiloxane comprising at least one reactive functional group and at least one material comprising at least one reactive functional group. Also provided are multi-layer composite coatings formed from a basecoat deposited from a pigmented coating composition and a topcoat applied over the basecoat, the topcoat deposited from the aforementioned coating composition. A method for improving the scratch resistance of a coated substrate, as well as coated substrates also are provided. The compositions of the invention provide highly scratch resistant coatings, particularly highly scratch resistant color-plus-clearcoatings.

67 Claims, No Drawings

FOREIGN PATENT DOCUMENTS

| | | |
|---|---|---|
| 3,398,174 A | 8/1968 | Barnes, Jr. |
| 3,450,791 A | 6/1969 | Sekmakas et al. |
| 3,479,328 A | 11/1969 | Nordstrom |
| 3,539,658 A | 11/1970 | Sekmakas et al. |
| 3,577,263 A | 5/1971 | Nordstrom |
| 3,577,265 A | 5/1971 | Nordstrom |
| 3,627,836 A | 12/1971 | Getson |
| 3,642,936 A | 2/1972 | Hodge et al. |
| 3,644,566 A | 2/1972 | Kincheloe et al. |
| 3,655,602 A | 4/1972 | Sekmakas |
| 3,668,183 A | 6/1972 | Hoy et al. |
| 3,799,854 A | 3/1974 | Jerabek et al. |
| 3,857,817 A | 12/1974 | Henshaw et al. |
| 3,919,315 A | 11/1975 | Wollweber et al. |
| 3,986,997 A | 10/1976 | Clark |
| 4,001,156 A | 1/1977 | Bosso et al. |
| 4,025,407 A | 5/1977 | Chang et al. |
| 4,025,456 A | 5/1977 | Litteral et al. |
| 4,027,073 A | 5/1977 | Clark |
| 4,046,729 A | 9/1977 | Scriven et al. |
| 4,089,763 A | 5/1978 | Dart et al. |
| 4,093,673 A | 6/1978 | Chang et al. |
| 4,104,240 A | 8/1978 | Buter |
| 4,147,679 A | 4/1979 | Scriven et al. |
| 4,177,315 A | 12/1979 | Ubersax |
| 4,211,823 A | 7/1980 | Suzuki et al. |
| 4,212,901 A | 7/1980 | van Neerbos et al. |
| 4,220,679 A | 9/1980 | Backhouse |
| 4,221,697 A | 9/1980 | Osborn et al. |
| 4,239,798 A | 12/1980 | Schroeter et al. |
| 4,254,185 A | 3/1981 | Buter |
| 4,271,062 A | 6/1981 | Boomgaard et al. |
| 4,278,574 A | 7/1981 | Dworak et al. |
| 4,279,800 A | 7/1981 | Boomgaard et al. |
| 4,308,060 A | 12/1981 | Talbot |
| 4,310,600 A | 1/1982 | Cross |
| 4,311,622 A | 1/1982 | Buter |
| 4,345,057 A | 8/1982 | Yamabe et al. |
| 4,348,462 A | 9/1982 | Chung |
| 4,368,294 A | 1/1983 | Deubzer et al. |
| 4,369,300 A | 1/1983 | Carter et al. |
| 4,395,461 A | 7/1983 | Ching |
| 4,403,003 A | 9/1983 | Backhouse |
| 4,403,093 A | 9/1983 | Hartman et al. |
| 4,408,018 A | 10/1983 | Bartman et al. |
| 4,410,594 A | 10/1983 | Olson |
| 4,413,086 A | 11/1983 | Chang et al. |
| 4,418,182 A | 11/1983 | Chattha |
| 4,427,820 A | 1/1984 | Backhouse et al. |
| 4,431,789 A | 2/1984 | Okazaki et al. |
| 4,456,647 A | 6/1984 | Schoenfelder et al. |
| 4,465,815 A | 8/1984 | Chattha |
| 4,477,536 A | 10/1984 | Wright et al. |
| 4,478,876 A | 10/1984 | Chung |
| 4,481,126 A | 11/1984 | Trinh et al. |
| 4,491,508 A | 1/1985 | Olson et al. |
| 4,499,150 A | 2/1985 | Dowbenko et al. |
| 4,499,151 A | 2/1985 | Dowbenko et al. |
| 4,512,677 A | 4/1985 | Trinh |
| 4,518,522 A | 5/1985 | Markusch et al. |
| 4,520,144 A | 5/1985 | Noren et al. |
| 4,522,958 A | 6/1985 | Das et al. |
| 4,526,910 A | 7/1985 | Das et al. |
| 4,563,372 A | 1/1986 | Kurauchi et al. |
| 4,569,966 A | 2/1986 | Piccirilli et al. |
| 4,592,816 A | 6/1986 | Emmons et al. |
| 4,598,111 A | 7/1986 | Wright et al. |
| 4,618,657 A | 10/1986 | Katchko et al. |
| 4,640,940 A | 2/1987 | Jacobine et al. |
| 4,652,470 A | 3/1987 | Das et al. |
| 4,663,377 A | 5/1987 | Hombach et al. |
| 4,665,116 A | 5/1987 | Kornhaber et al. |
| 4,673,718 A | 6/1987 | Ryntz et al. |
| 4,677,004 A | 6/1987 | Das et al. |
| 4,680,204 A | 7/1987 | Das et al. |
| 4,681,811 A | 7/1987 | Simpson et al. |
| 4,689,383 A | 8/1987 | Riffle et al. |
| 4,713,410 A | 12/1987 | Katchko et al. |
| 4,728,543 A | 3/1988 | Kurauchi et al. |
| 4,728,545 A | 3/1988 | Kurauchi et al. |
| 4,728,690 A | 3/1988 | Lammerting et al. |
| 4,732,790 A | 3/1988 | Blackburn et al. |
| 4,754,014 A | 6/1988 | Ryntz et al. |
| 4,764,569 A | 8/1988 | Umemoto et al. |
| 4,766,185 A | 8/1988 | Ryntz et al. |
| 4,798,746 A | 1/1989 | Claar et al. |
| 4,804,732 A | 2/1989 | Ryntz et al. |
| 4,808,649 A | 2/1989 | Gay et al. |
| 4,816,333 A | 3/1989 | Lange et al. |
| 4,822,828 A | 4/1989 | Swofford |
| 4,835,023 A | 5/1989 | Taniguchi et al. |
| 4,851,294 A | 7/1989 | Buter et al. |
| 4,870,140 A | 9/1989 | Ryntz et al. |
| 4,873,298 A | 10/1989 | Ryntz et al. |
| 4,892,906 A | 1/1990 | Pham et al. |
| 4,910,097 A | 3/1990 | Nomura et al. |
| 4,925,659 A | 5/1990 | Grollier et al. |
| 4,927,868 A | 5/1990 | Schimmel et al. |
| 5,025,054 A | 6/1991 | Yoshida et al. |
| 5,035,748 A | 7/1991 | Burow et al. |
| 5,059,707 A | 10/1991 | Motegi et al. |
| 5,066,698 A | 11/1991 | Hazan et al. |
| 5,066,720 A | 11/1991 | Ohsugi et al. |
| 5,071,904 A | 12/1991 | Martin et al. |
| 5,075,165 A | 12/1991 | Kishi et al. |
| 5,075,370 A | 12/1991 | Kubitza et al. |
| 5,084,541 A | 1/1992 | Jacobs, III et al. |
| 5,085,694 A | 2/1992 | Cifuentes |
| 5,086,087 A | 2/1992 | Misev |
| 5,098,947 A | 3/1992 | Metzger et al. |
| 5,098,983 A | 3/1992 | Mosbach et al. |
| 5,102,746 A | 4/1992 | Shindou et al. |
| 5,104,922 A | 4/1992 | Chang |
| 5,104,929 A | 4/1992 | Bilkadi |
| 5,110,891 A | 5/1992 | Cifuentes et al. |
| 5,112,403 A | 5/1992 | Okura et al. |
| 5,114,756 A | 5/1992 | Mirabeau et al. |
| 5,116,418 A | 5/1992 | Kaliski et al. |
| 5,141,555 A | 8/1992 | Elepano |
| 5,147,730 A | 9/1992 | Ogishi et al. |
| 5,154,759 A | 10/1992 | Cifuentes et al. |
| 5,162,420 A | 11/1992 | Chang et al. |
| 5,174,813 A | 12/1992 | Cifuentes et al. |
| 5,194,487 A | 3/1993 | Jacobs |
| 5,196,485 A | 3/1993 | McMonigal et al. |
| 5,212,216 A | 5/1993 | Hattori et al. |
| 5,212,273 A | 5/1993 | Das et al. |
| 5,213,846 A | 5/1993 | Tsuneta et al. |
| 5,235,018 A | 8/1993 | Potter et al. |
| 5,248,789 A | 9/1993 | Wolff |
| 5,256,452 A | 10/1993 | McMonigal et al. |
| 5,258,063 A | 11/1993 | Cifuentes et al. |
| 5,258,225 A | 11/1993 | Katsamberis |
| 5,258,424 A | 11/1993 | Yagi et al. |
| 5,260,350 A | 11/1993 | Wright |
| 5,260,469 A | 11/1993 | Swiatek |
| 5,268,256 A | 12/1993 | Goetz et al. |
| 5,286,835 A | 2/1994 | Green et al. |
| 5,304,400 A | 4/1994 | Dhein et al. |
| 5,308,494 A | 5/1994 | Brandon et al. |
| 5,314,947 A | 5/1994 | Sawaragi |

| | | | | | |
|---|---|---|---|---|---|
| 5,322,873 A | 6/1994 | Pohl et al. | EP | 0571187 | 11/1993 |
| 5,322,890 A | 6/1994 | Ando et al. | EP | 0586048 | 3/1994 |
| 5,328,975 A | 7/1994 | Hanson et al. | EP | 0607710 | 7/1994 |
| 5,346,958 A | 9/1994 | Yukawa et al. | EP | 0665252 | 8/1995 |
| 5,356,669 A | 10/1994 | Rehfuss et al. | EP | 0735118 | 10/1996 |
| 5,367,019 A | 11/1994 | Sawaragi | EP | 0767232 | 4/1997 |
| 5,378,735 A | 1/1995 | Hosokawa et al. | EP | 0 774 499 | 5/1997 |
| 5,387,642 A | 2/1995 | Blum et al. | EP | 0819719 | 1/1998 |
| 5,389,705 A | 2/1995 | Huemke et al. | EP | 0832947 | 4/1998 |
| 5,389,718 A | 2/1995 | Potter et al. | EP | 0897962 | 2/1999 |
| 5,393,823 A | 2/1995 | Konno et al. | EP | 0928800 | 7/1999 |
| 5,395,955 A | 3/1995 | Okawa et al. | EP | 0940422 | 9/1999 |
| 5,397,638 A | 3/1995 | Miki et al. | EP | 0995778 | 4/2000 |
| 5,426,131 A | 6/1995 | Katsamberis | GB | 1080549 | 8/1967 |
| 5,430,083 A | 7/1995 | Klier et al. | GB | 1293331 | 10/1972 |
| 5,432,233 A | 7/1995 | Miyazoe et al. | GB | 1409741 | 10/1975 |
| 5,438,083 A | 8/1995 | Takimoto et al. | GB | 2140018 | 11/1984 |
| 5,439,957 A | 8/1995 | Takimoto et al. | GB | 2174400 | 11/1986 |
| 5,444,104 A | 8/1995 | Waknine | JP | 54-1335 | 1/1979 |
| 5,445,871 A | 8/1995 | Murase et al. | JP | 55-17073 | 5/1980 |
| 5,461,102 A | 10/1995 | Masuda et al. | JP | 56-157461 | 12/1981 |
| 5,468,461 A | 11/1995 | Hosoda et al. | JP | 58-58123 | 12/1983 |
| 5,468,802 A | 11/1995 | Wilt et al. | JP | 58-217515 | 12/1983 |
| 5,470,504 A | 11/1995 | Kiehn et al. | JP | 59-092948 | 5/1984 |
| 5,571,297 A | 11/1996 | Swei et al. | JP | 60-168770 | 9/1985 |
| 5,587,428 A | 12/1996 | Jones et al. | JP | 60-250069 | 12/1985 |
| 5,589,129 A | 12/1996 | Kato et al. | JP | 61-141684 | 6/1986 |
| 5,593,733 A | 1/1997 | Mayo | JP | 62-252480 | 11/1987 |
| 5,602,204 A | 2/1997 | Harimoto et al. | JP | 64-004663 | 1/1989 |
| 5,614,640 A | 3/1997 | Okawa | JP | 1-141952 | 6/1989 |
| 5,641,854 A | 6/1997 | Jones et al. | JP | 3258866 | 11/1991 |
| 5,663,240 A | 9/1997 | Simeone et al. | JP | 03296567 | 12/1991 |
| 5,663,244 A | 9/1997 | Barancyk et al. | JP | 5043696 | 2/1993 |
| 5,686,012 A | 11/1997 | Hayashi et al. | JP | 5-15533 | 3/1993 |
| 5,693,723 A | 12/1997 | Green | JP | 5065416 | 3/1993 |
| 5,693,724 A | 12/1997 | Green | JP | 06100799 | 4/1994 |
| 5,709,950 A | 1/1998 | Burgman et al. | JP | 7070509 | 3/1995 |
| 5,719,234 A | 2/1998 | Yabuta et al. | JP | 7-62214 | 7/1995 |
| 5,756,221 A | 5/1998 | Horibe et al. | JP | 9-165450 | 6/1997 |
| 5,780,530 A | 7/1998 | Mizutani et al. | JP | 09227688 | 9/1997 |
| 5,798,409 A | 8/1998 | Ho | JP | 10017670 | 1/1998 |
| 5,800,910 A | 9/1998 | Harke et al. | WO | WO 95/28452 | 10/1995 |
| 5,814,410 A | 9/1998 | Singer et al. | WO | WO 96/01864 | 1/1996 |
| 5,840,806 A | 11/1998 | Komazaki et al. | WO | WO 97/13741 | 4/1997 |
| 5,853,809 A | 12/1998 | Campbell et al. | WO | WO 97/26304 | 7/1997 |
| 5,876,806 A | 3/1999 | Ogawa | WO | WO 97/29854 | 8/1997 |
| 5,886,082 A | 3/1999 | Numa et al. | WO | WO 97/44402 | 11/1997 |
| 5,891,981 A | 4/1999 | Mauer et al. | WO | WO 98/38251 | 9/1998 |
| 5,914,162 A | 6/1999 | Bilkadi | WO | WO 98/40170 | 9/1998 |
| 5,922,475 A | 7/1999 | Barancyk et al. | WO | WO-99/06487 | 2/1999 |
| 5,939,491 A | 8/1999 | Wilt et al. | WO | WO 99/58589 | 11/1999 |
| 5,942,556 A | 8/1999 | Friedlander et al. | WO | WO 00/39183 | 7/2000 |
| 5,976,701 A | 11/1999 | Barancyk et al. | WO | WO 00/58024 | 10/2000 |
| 5,998,504 A | 12/1999 | Groth et al. | | | |
| 5,998,543 A | 12/1999 | Collins et al. | | | |
| 6,005,045 A | 12/1999 | Klanica | | | |
| 6,013,724 A | 1/2000 | Mizutani et al. | | | |
| 6,013,733 A | 1/2000 | Singer et al. | | | |
| 6,022,919 A | 2/2000 | Komoto et al. | | | |
| 6,045,870 A | 4/2000 | Noura et al. | | | |
| 6,048,934 A | 4/2000 | Wilt et al. | | | |
| 6,063,438 A | 5/2000 | Ogawa | | | |
| 6,080,816 A | 6/2000 | Gregorovich et al. | | | |
| 6,087,438 A | 7/2000 | Herber et al. | | | |
| 6,204,331 B1 | 3/2001 | Sullivan et al. | | | |
| 6,387,519 B1 | 5/2002 | Anderson et al. | | | |

FOREIGN PATENT DOCUMENTS

| | | |
|---|---|---|
| EP | 0277816 | 8/1988 |
| EP | 0356963 | 3/1990 |
| EP | 0372124 | 6/1990 |

OTHER PUBLICATIONS

Degussa, No. 6, Technical Bulletin Pigments, Hydrophobic Aerosil® Manufacture, Properties, and Applications, $4^{th}$ Edition, Aug. 1986.

Williams et al., "Polyester Oligomers of Narrowed Molecular Weight Distribution", Water–Borne & Higher–Solids Coatings Symposium, pp. 478–512, Feb. 3–5, 1988, New Orleans, LA, USA.

"Siloxanes With Aliphatic Isocyanate Groups, A Tetrafunctional Cross–Linking Agent", Guangbin Zhou and Richard Fragnito, Johannes Smid, Polymer Bulletin 22, pp. 85–88 (1989), Springer–Verlag.

Odian, G., "Principles of Polymerization, 3rd Edition", John Wiley & Sons; Inc. ISBN: 0471610208, pp. 19–24, Published Oct. 18, 1991.

Greene, T. W. et al., "Protective Groups in Organic Synthesis", Second Edition, John Wiley & Sons, Inc., pp. 68–86; & 261–263.

"Regioselective Rhodium–Containing Catalysts for Ring–Opening Polymerizations and Hydrosilylations", J.V. Crivello and M. Fan, Journal of Polymer Science: Part A: Polymer Chemistry, vol. 30, pp. 1–11 (1992), John Wiley & Sons, Inc.

"Synthesis of Novel Organic Oligomers Containing Si–H Bonds", T. Iwahara, M. Jusakabe, M. Chiba and K. Yonezawa, Journal of Polymer Science: Part A: Polymer Chemistry, vol. 31, pp. 2617–2631 (1993), John Wiley & Sons, Inc.

Schmidt, C., et al., "Inorganic–organic Hybrid Coatings For Metal And Glass Surfaces", PMSE, Spring 1994, pp. 347–348.

Etranian, A. et al., "Les Silices Greffees Ameliorent Les Revetements", Peintures & Encres, Informations Chimie, n 371– Sep. 1995, pp. 85–88.

Espiard et al, "Poly(ethyl acrylate) latexes Encapsulating Nanoparticles of Silica: 3. Morphology and Mechanical Properties of Reinforced Films", Polymer, vol. 36, No. 23, pp. 4397–4403, Elsevier Science Ltd., 1995.

Jones, F., "Toward Solventless Liquid Coatings", Journal of Coatings Technology, vol. 68, No. 852, pp. 25–36, Jan. 1996.

"Highlink® OG Silica Organosols," Clariant, Societe Francais Hoechst, BL Chimie Fine, AE/MS.22/96.

Varerkar M.P., "Formulating High Solids Coatings: The Solution to VOC Problem", Paintindia, Sep. 1996, pp. 19–30.

Misra, M., et al., "Hybrid Inorganic–Organic UV–Curable Abrasion–Resistant Coatings", Surface Coatings International, (12) 1998, pp. 594–595.

Chandra et al., "Telechelic Oligomers for High Solids Coatings", Paintindia, Feb. 1997, pp. 35–44.

Jones, F., "New Technology Holds Key", Paint & Coatings Industry, May 1997, pp. 62–64.

Chemical Abstracts 128:62925a, Noboru et al., "Coating Pocess Using Siloxy–Containing Vinyl Polymer Clear Coatings", Jpn. Kokai Tokkyo Joho JP 09, 314,040, Sep. 12, 1997 (abstract).

Azuma et al, "Acrylic Oligomer for High Solid Automotive Top Coating System Having Excellent Acid Resistance", Progress In Organic Coatings, vol. 32, Sep.–Dec. 1997, pp. 1–7.

Gettwert, G., et al., "One–Component Silicate Binder Systems for Coatings", Surface Coatings International, (12) 1998, pp. 596–603.

Wu, Shobing, et al, "Effect of Siloxane Functionalized Caprolactone Polyols on Photocurable Epoxy Coatings", Journal of Coatings Technology, vol. 70, No. 887, Dec. 1998, pp. 53–62.

Perry, R. J., "Applications for Cross–linked Siloxane Particles", Chemtech, Feb. 1999, pp. 39–44.

Frings, S., et al., "Morphology of Hybrid Coatings Based on Polyester, Melamine Resin, and Silica and the Relation with Hardness and Scratch Resistance", Journal of Coatings Technology, vol. 72, No. 901, Feb. 2000, pp. 83–89.

Straehle, Dr. Wolfgang, Head of the Corporate Division, Research and Purchasing, and the Operating Division, Industrial Coating, BASF Coatings AG, Münster, Germany, "Scratchproof Clearcoat: High Gloss for the Long Term", www.pcimaq.com, posted Jul. 25, 2000.

Organo Silicasol, Nissan Chemical Industries, Ltd., Nissan Chemical America Corporation webpage, http://www.snowtex.com/organo_types.html.

Wicks, Zeno W., et al., "Organic Coatings: Science And Technology," second edition, Chapter 23, pp. 433–439 (Wiley–Interscience, c1999).

Smetankina, N.P., et al., "Investigation of the Interrelationship Between the Compositions, Production processes, and Properties of Polyurethanes With Reticular Structures. XV. Introduction of Organosilicon Carbofunctional Glycols Into Polyurethane Lacquer Compounds", Institute of High–Molecular Compound Chemistry of the Academy of Sciences (AS) of the Ukrainian Soviet Socialist Republic (UkrSSR) (with translation).

Kotomkin, V. Ya, et al., "Resistance of Polysiloxane Urethanes to the Action of Solvents and Corrosive Media", UDS 618.(664+64):619.34 (with translation).

Frings, S., et al., "Preparation and Characterization of Organic–Inorganic Hybrid Coatings Based on Crosslinked Polyester Systems and Silica, Formed Via the Sol–Gel Process", Presented at the International Waterborne, High–Solids, and Powder Coatings Symposium, Feb. 10–12, 1999, New Orleans, L.A. USA, pp. 35–43.

U.S. Appl. No. 09/629,421, Barancyk et al., "Coating Compositions Comprising Silyl Blocked Components, Coatings, Coated Substrates and Methods Related Thereto," filed Jul. 31, 2000.

U.S. Appl. No. 09/629,422, Anderson et al., "Scratch Resistant Dual Cure Coatings, Coated Substrates and Methods Related Thereto," filed Jul. 31, 2000.

U.S. Appl. No. 09/629,443, Anderson et al., "Coating Compositions Having Improved Scratch Resistance, Coated Substrates and Methods Related Thereto," filed Jul. 31, 2000.

U.S. Appl. No. 09/629,444, Anderson et al., "Coating Compositions Having Improved Scratch Resistance, Coated Substrates, and Methods Related Thereto," filed Jul. 31, 2000.

FLEXIBLE COATING COMPOSITIONS HAVING IMPROVED SCRATCH RESISTANCE, COATED SUBSTRATES AND METHODS RELATED THERETO

CROSS-REFERENCE TO RELATED APPLICATIONS

This is a division of application Ser. No. 09/629,420, filed Jul. 31, 2000, now U.S. Pat. No. 6,610,777, which issued on Aug. 26, 2003, which is a continuation-in-part of application Ser. No. 09/489,042 and application Ser. No. 09/489,043, both filed Jan. 21, 2000, now abandoned, which are continuation-in-part applications of application Ser. No. 09/365,069, filed Jul. 30, 1999, now abandoned. U.S. application Ser. Nos. 09/489,042 and 09/489,043 claim benefit of provisional application Ser. Nos. 60/171,898 and 60/171,899, both filed Dec. 23, 1999, all of which are incorporated herein by reference.

FIELD OF THE INVENTION

Certain embodiments of the present invention are directed to coating compositions comprising at least one reactive functional group-containing polysiloxane, at least one material comprising at least one functional group selected from at least one polyol group and at least one carbamate group, and at least one reactant comprising at least one functional group that is reactive with at least one functional group selected from the at least one functional group of the polysiloxane and the at least one functional group of at least one material. Other embodiments of the present invention are directed to cured coatings formed from the foregoing coating compositions. Further embodiments are directed to substrates coated with the aforementioned compositions. Embodiments of the present invention also are directed to methods for improving the scratch resistance of a polymeric substrate or polymer coated substrate.

BACKGROUND OF THE INVENTION

Color-plus-clearcoating systems involving the application of a colored or pigmented basecoat to a substrate followed by application of a transparent or clearcoat over the basecoat have become increasingly popular as original finishes for a number of consumer products including, for example, automotive vehicles. The color-plus-clearcoating systems have outstanding appearance properties such as gloss and distinctness of image, due in large part to the clearcoat. Such color-plus-clearcoating systems have become popular for use with automotive vehicles, aerospace applications, floor coverings such as ceramic tiles and wood flooring, packaging coatings and the like.

Topcoat coating compositions, particularly those used to form the transparent clearcoat in color-plus-clearcoating systems for automotive applications, are subject to defects that occur during the assembly process as well as damage from numerous environmental elements. Such defects during the assembly process include paint defects in the application or curing of the basecoat or the clearcoat. Damaging environmental elements include acidic precipitation, exposure to ultraviolet radiation from sunlight, high relative humidity and high temperatures, defects due to contact with objects causing scratching of the coated surface, and defects due to impact with small, hard objects resulting in chipping of the coating surface.

Typically, a harder more highly crosslinked film may exhibit improved scratch resistance, but it is less flexible and much more susceptible to chipping or thermal cracking due to embrittlement of the film resulting from a high crosslink density. A softer, less crosslinked film, while not prone to chipping or thermal cracking, is susceptible to scratching, waterspotting, and acid etch due to a low crosslink density of the cured film.

Further, elastomeric automotive parts and accessories, for example, elastomeric bumpers and body side moldings, are typically coated "off site" and shipped to automobile assembly plants. The coating compositions applied to such elastomeric substrates are typically formulated to be very flexible so the coating can bend or flex with the substrate without cracking. To achieve the requisite flexibility, coating compositions for use on elastomeric substrates often are formulated to produce coatings with lower crosslink densities or to include flexibilizing adjuvants which act to lower the overall film glass transition temperature (Tg). While acceptable flexibility properties can be achieved with these formulating techniques, they also can result in softer films that are susceptible to scratching. Consequently, great expense and care must be taken to package the coated parts to prevent scratching of the coated surfaces during shipping to automobile assembly plants.

A number of patents teach the use of a coating composition comprising a dispersion of colloidal silica in an alcohol-water solution of a partial condensate of a silanol of the formula $RSi(OH)_3$ wherein at least 70 weight percent of the partial condensate is the partial condensate of $CH_3Si(OH)_3$. Representative, nonlimiting examples are U.S. Pat. Nos. 3,986,997, 4,027,073, 4,239,738, 4,310,600 and 4,410,594.

U.S. Pat. No. 4,822,828 teaches the use of a vinyl functional silane in an aqueous, radiation curable, coating composition which comprises: (a) from 50 to 85 percent, based on the total weight of the dispersion, of a vinyl functional silane, (b) from 15 to 50 percent, based on the total weight of the dispersion of a multifunctional acrylate, and (c) optionally, from 1 to 3 weight percent of a photoinitiator. The vinyl-functional silane is the partial condensate of silica and a silane, such that at least sixty percent of the silane is a vinyl-functional silane conforming to the formula $(R)_a Si(R')_b (R'')_c$ wherein R is allyl or vinyl functional alkyl; R' is hydrolyzable alkoxy or methoxy; R" is non-hydrolyzable, saturated alkyl, phenyl, or siloxy, such that $a+b+c=4$; and $a \geq 1$; $b \geq 1$; $c \geq 0$. The patent discloses that these coating compositions may be applied to plastic substrates and cured by exposure to ultraviolet or electron beam irradiation to form a substantially clear, abrasion resistant layer.

U.S. Pat. No. 5,154,759 teaches a polish formulation comprising a reactive amine functional silicone polymer and at least one other ingredient normally used in polish formulations. One such ingredient disclosed in the patent is an abrasive, which is taught to be aluminum silicate, diatomaceous earth, pumice, fuller's earth, bentonite, silica, tripoli, hydrated calcium silicate, chalk, colloidal clay, magnesium oxide red iron oxide, or tin oxide.

U.S. Pat. No. 5,686,012 describes modified particles comprising inorganic colored or magnetic particles as core particles, and at least one polysiloxane modified with at least one organic group which is coated on the surfaces of the core particles. The patent also discloses a water-based paint comprising a paint base material and the modified particles as the pigment as well as a process for producing the modified particles.

U.S. Pat. No. 5,853,809 discloses clearcoats in color-plus-clear systems which have improved scratch resistance due to the inclusion in the coating composition of inorganic particles such as colloidal silicas which have been surface modified with a reactive coupling agent via covalent bonding.

U.S. Pat. No. 5,709,950 teaches flexible, aminoplast-curable coating compositions comprising polyether polymers having terminal or pendent carbamate groups in conjunction with other hydroxyl or carbamate functional film-forming polymers. These compositions are useful as topcoating compositions in multi-layer composite coating compositions for plastic automotive parts.

Despite recent improvements in color-plus-clearcoating systems, there remains a need in the automotive coatings art for topcoats having good initial scratch resistance as well as enhanced post-weathering ("retained") scratch resistance without embrittlement of the film due to high crosslink density. Moreover, it would be advantageous to provide topcoats for elastomeric substrates utilized in the automotive industry which are both flexible and resistant to scratching.

SUMMARY OF THE INVENTION

In one embodiment, the present invention provides a coating composition formed from components comprising: (a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

(b) wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; (b) at least one polyol having a hydroxyl value ranging from 100 to 200; and (c) at least one reactant comprising at least one functional group that is reactive with at least one functional group selected from the at least one reactive functional group of the at least one polysiloxane (a) and at least one functional group of the at least one polyol (b), wherein each component is different, and wherein a coating formed from the coating composition when cured has a flexibility rating of at least 6 according to a Flexibility Test Method at a temperature of 70° F.

In another embodiment, the present invention is directed to a coating composition formed from components comprising: (a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; (b) at least one material comprising at least one reactive functional group; and (c) at least one reactant comprising at least one functional group that is reactive with at least one functional group selected from the at least one reactive functional group of the at least one polysiloxane (a) and at least one reactive functional group of the at least one material (b), wherein each component is different, and wherein a coating formed from the coating composition when cured has a flexibility rating of at least 6 according to a Flexibility Test Method at a temperature of 70° F.

In still another embodiment, a coating composition is provided which is formed from components comprising: (a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; and (b) at least one reactant comprising at least one functional group that is reactive with at least one reactive functional group of the at least one polysiloxane (a), such that a coating formed from the coating composition when cured has a flexibility rating of at least 6 according to a Flexibility Test method of at least 6 at a temperature of 70° F., wherein each component is different, and wherein the coating formed from the coating composition when cured has an initial scratch resistance value such that after scratch testing greater than 40 percent of initial 20° gloss is retained.

In another embodiment, the present invention is directed to a coating composition formed from components comprising (a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; (b) less than 30 weight percent on a basis of total resin solids of the components which form the coating composition of at least one polyol having a hydroxyl value ranging from 100 to 200; and (c) at least one reactant comprising at least one functional group that is reactive with at least one functional group selected from the at least one reactive functional group of the at least one polysiloxane (a) and at least one functional group of the at least one polyol (b), wherein each component is different, and wherein a coating formed from the coating composition when cured has a glass transition temperature ranging from 20° C. to 100° C.

In another embodiment, the present invention is directed to a coating composition formed from components comprising (a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$, (b) at least one polyol selected from a polyether polyol and a polyester polyol and having a hydroxyl value ranging from 100 to 200, and (c) at least one aminoplast resin, and (d) at least one polyisocyanate, wherein each component is different, and wherein a coating formed from the coating composition when cured has a flexibility rating of at least 6 according to a Flexibility Test method at a temperature of 70° F.

In another embodiment, the present invention is directed to a coating composition formed from components comprising (a) at least one polysiloxane comprising at least one reactive functional group, the at least one polysiloxane comprising at least one of the following structural units (I):

$$R^1_n R^2_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$, (b) less than 30 weight percent on a basis of total resin solids of the components which form the coating composition of at least one polyol selected from a polyether polyol and a polyester polyol and having a hydroxyl value ranging from 100 to 200, and (c) at least one aminoplast resin, and (d) at least one polyisocyanate, wherein each component is different and wherein a coating formed from the coating composition when cured has a glass transition temperature ranging from −20° C. to 100° C.

In yet another embodiment, the present invention is directed to a coating composition formed from components comprising (a) at least one polysiloxane comprising at least one reactive functional group, the at least one polysiloxane comprising at least one of the following structural units (I):

$$R^1_n R^2_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$, and (b) a carbamate functional material different from (a).

Also, the present invention provides cured coatings formed from any of the foregoing coating compositions. Additionally, multi-component composite coatings formed from a basecoat deposited from a pigmented coating composition and a topcoat which is applied over the basecoat and which is formed from any of the foregoing coating compositions is provided.

Coated substrates comprising a substrate and having any of the foregoing coating compositions coated over at least a portion of the substrate also are provided by the present invention. The present invention also provides methods for coating a substrate comprising applying over at least a portion of the substrate any of the foregoing coating compositions.

Another aspect of the present invention are methods for improving the scratch resistance of a polymeric substrate or polymer coated substrate by applying to at least a portion of the substrate any of the foregoing coating compositions. Other methods provided include methods for retaining the gloss of a polymer coated substrate after a predetermined period of time, comprising applying any of the foregoing coating compositions over a polymer coated surface of the substrate and methods for revitalizing the gloss of a polymer coated substrate after a predetermined period of time comprising applying any of the foregoing coating compositions over the polymer coated surface of the substrate.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

DETAILED DESCRIPTION OF THE PREFERRED EMBODIMENTS

In one embodiment, the present invention provides a coating composition formed from components comprising: (a) at least one polysiloxane comprising at least one reactive functional group, the at least one polysiloxane comprising at least one of the following structural units (I):

$$R^1_n R^2_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; (b) at least one polyol having a hydroxyl value ranging from 100 to 200; and (c) at least one reactant comprising at least one functional group that is reactive with at least one functional group selected from the at least one reactive functional group of the at least one polysiloxane (a) and at least one functional group of the at least one polyol (b), wherein each component is different, and wherein a coating formed from the coating composition when cured has a flexibility rating of at least 6 according to a Flexibility Test Method at a temperature of 70° F.

It should be understood that the "at least one polysiloxane comprising at least one structural unit (I)" above is a polymer that contains at least two Si atoms per molecule. As used herein, the term "polymer" in meant to encompass oligomer, and includes without limitation both homopolymers and copolymers. It should also be understood that the at least one polysiloxane can include linear, branched, dendritic or cyclic polysiloxanes.

Moreover, as used herein, "formed from" denotes open, e.g., "comprising," claim language. As such, it is intended that a composition "formed from" a list of recited components be a composition comprising at least these recited components, and can further comprise other, nonrecited components, during the composition's formation.

Also, as used herein, the term "reactive" refers to a functional group that forms a covalent bond with another functional group under conditions sufficient to cure the composition.

As used herein, the phrase "each component is different" refers to components which do not have the same chemical structure as other components in the composition.

Each of m and n depicted in the at least one structural unit (I) above fulfill the requirements of $0<n<4$, $0<m<4$ and $2 \leq (m+n) < 4$. When (m+n) is 3, the value represented by n can be 2 and the value represented by m is 1. Likewise, when (m+n) is 2, the value represented by each of n and m is 1.

As used herein, the term "cure" as used in connection with a composition, e.g., "composition when cured," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

In a further embodiment, the present invention is directed to cured compositions as previously described wherein at least one reactant is present during the formation of the coating composition. As used herein, the "at least one reactant" refers to any material comprising a functional group that is reactive with at least one functional group selected from at least one functional group of the at least one polysiloxane and at least one functional group of the material. In one embodiment, the at least one reactant can be selected from at least one curing agent.

In another embodiment, the present invention is directed to a coating composition formed from components comprising: (a) at least one polysiloxane comprising at least one reactive functional group, the at least one polysiloxane comprising at least one of the following structural units (I):

$$R^1{}_n R^2{}_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2 \leq (m+n) < 4$; (b) at least one material comprising at least one reactive functional group; and (c) at least one reactant comprising at least one functional group that is reactive with at least one functional group selected from the at least one reactive functional group of the at least one polysiloxane (a) and the at least one reactive functional group of the at least one material (b), wherein each component is different, and wherein a coating formed from the coating composition when cured has a flexibility rating of at least 6 according to a Flexibility Test Method at a temperature of 70° F.

In another embodiment, the present invention is directed to any compositions as described above, wherein $R^2$, which may be identical or different, represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

As used herein, a "monovalent hydrocarbon group" means a monovalent group having a backbone repeat unit based exclusively on carbon. As used herein, "monovalent" refers to a substituent group that, as a substituent group, forms only one single, covalent bond. For example, a monovalent group on the at least one polysiloxane will form one single covalent bond to a silicon atom in the backbone of the at least one polysiloxane polymer. As used herein, "hydrocarbon groups" are intended to encompass both branched and unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example, methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example, oxygen, nitrogen, and halogen atoms.

As used herein, "siloxane" means a group comprising a backbone comprising two or more —SiO— groups. For example, the siloxane groups represented by $R^1$, which is discussed above, and R, which is discussed below, can be branched or unbranched, and linear or cyclic. The siloxane groups can be substituted with pendant organic substituent groups, for example, alkyl, aryl, and alkaryl groups. The organic substituent groups can be substituted with heteroatoms, for example, oxygen, nitrogen, and halogen atoms, reactive functional groups, for example, those reactive functional groups discussed above with reference to $R^2$, and mixtures of any of the foregoing.

In another embodiment, the present invention is directed to any composition as previously described, wherein the at least one reactant (c) is selected from at least one curing agent.

In one embodiment, the present invention is directed to any composition as previously described, wherein the at least one polysiloxane comprises at least two reactive functional groups. The at least one polysiloxane can have a reactive group equivalent weight ranging from 50 to 1000 mg per gram of the at least one polysiloxane. In one embodiment, the at least one polysiloxane has a hydroxyl group equivalent weight ranging from 50 to 1000 mg KOH per gram of the at least one polysiloxane. In another embodiment, the at least one polysiloxane has a hydroxyl group equivalent weight ranging from 100 to 300 mg KOH per gram of the at least one polysiloxane, while in another embodiment, the hydroxyl group equivalent weight ranges from 100 to 500 mg KOH per gram.

In another embodiment, the present invention is directed to any composition as previously described, wherein at least one $R^2$ group represents a group comprising at least one reactive functional group selected from a hydroxyl group and a carbamate group. In yet another embodiment, the present invention is directed to any composition as previously described, wherein at least one $R^2$ group represents a group comprising at least two reactive functional groups selected from a hydroxyl group and a carbamate group. In another embodiment, the present invention is directed to any composition as previously described, wherein at least one $R^2$ group represents a group comprising an oxyalkylene group and at least two hydroxyl groups.

In one embodiment, the present invention is directed to any composition as previously described, wherein the at least one polysiloxane has the following structure (II) or (III):

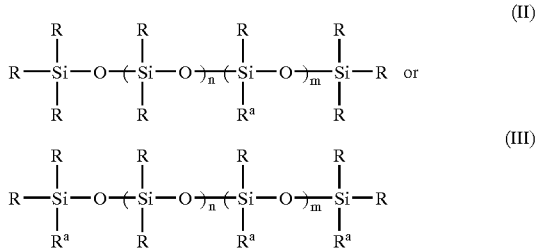

wherein: m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —$R^a$ comprises the following structure (IV):

wherein —$R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_{10}$, $(CH_2)_{10}$, and $(CH_2)_{23}$, respectively, as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —$(CH_2)_3OCH_2C(CH_2OH)_2(CH_2CH_2—)$.

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-α,α-dimethylbenzyl isocyanate, such as —$(CH_2)_2C_6H_4$— and —$CH_2CH(CH_3)C_6H_3(C(CH_3)_2$ (NCO). As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In one embodiment, the present invention is directed to any composition as previously described wherein the substituent group $R^3$ represents an oxyalkylene group. In another embodiment, $R^3$ represents an oxyalkylene group, and X represents a group which comprises at least two reactive functional groups.

In another embodiment, the present invention is directed to any composition as previously described comprising at least one polysiloxane having the structure (II) or (III) described above, wherein (n+m) ranges from 2 to 9. In yet another embodiment, in compositions comprising at least one polysiloxane having the structure (II) or (III) described above, (n+m) ranges from 2 to 3. In another embodiment, in compositions comprising at least one polysiloxane having the structure (II) or (III) described above, (n'+m') ranges from 2 to 9. In another embodiment, in compositions comprising at least one polysiloxane having the structure (II) or (III) described above, (n'+m') ranges from 2 to 3.

In one embodiment, the present invention is directed to any composition as previously described wherein X represents a group comprising at least one reactive functional group selected from a hydroxyl group and a carbamate group. In another embodiment, the present invention is directed to composition as previously described wherein X represents a group which comprises at least two hydroxyl groups. In yet another embodiment, the present invention is directed to any composition as previously described wherein X represents a group which comprises at least one group selected from H, a monohydroxy-substituted organic group, and a group having the following structure (V):

wherein the substituent group $R^4$ represents

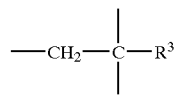

when p is 2 and the substituent group $R^3$ represents a $C_1$ to $C_4$ alkylene group, or the substituent group $R^4$ represents

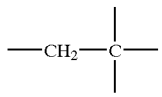

when p is 3,
wherein at least a portion of X represents a group having the structure (V). In another embodiment, the present invention is directed to any composition as previously described wherein m is 2 and p is 2.

In one embodiment, the present invention is directed to any composition as previously described comprising at least one polysiloxane having the structure (II) or (III), wherein, if no curing agent is present, and if the at least one polysiloxane is a partial condensate of a silanol, then less than 70% by weight of the partial condensate is the partial condensate of $CH_3Si(OH)_3$. These components used in these various embodiments can be selected from the coating components discussed above, and additional components also can be selected from those recited above.

In another embodiment, the present invention is directed to any composition as previously described, wherein the at least one polysiloxane (a) is the reaction product of at least the following reactants: (i) at least one polysiloxane of the formula (VI):

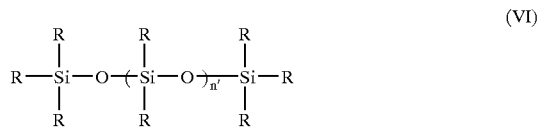

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, also can range from 0 to 10, and can further range from 0 to 5, such that the percent of SiH content of the polysiloxane ranges from 2 to 50 percent, and can range from 5 to 25 percent; and (ii) at least one molecule which comprises at least functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group and at least one unsaturated bond capable of undergoing a hydrosilylation reaction. In another embodiment, the at least one functional group is chosen from hydroxyl groups.

It should be appreciated that the various R groups can be the same or different, and, in certain embodiments, the R groups will be entirely monovalent hydrocarbon groups or will be a mixture of different groups such as, for example, monovalent hydrocarbon groups and hydroxyl groups.

In another embodiment, this reaction product is ungelled. As used herein, "ungelled" refers to a reaction product that is substantially free of crosslinking and has an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example, the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two, such as is commercially available from BASF Corporation as MASILWAX BASE®.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane (a) can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example, CARDURA E available from Shell Chemical Co., and mixtures of any of the foregoing.

In another embodiment, the present invention is directed to any composition as previously described wherein the at least one polysiloxane is a carbamate functional group-containing polysiloxane which comprises the reaction product of at least the following reactants:

(i) at least one polysiloxane containing silicon hydride of structure (VI) above where R and n' are as described above for that structure;

(ii) at least one hydroxyl functional group-containing material having one or more unsaturated bonds capable of undergoing hydrosilylation reaction as described above; and (iii) at least one low molecular weight carbamate functional material, comprising the reaction product of an alcohol or glycol ether and a urea.

Examples of such "low molecular weight carbamate functional material" include, but are not limited to, alkyl carbamate and hexyl carbamates, and glycol ether carbamates described in U.S. Pat. Nos. 5,922,475 and 5,976,701, which is incorporated herein by reference.

The carbamate functional groups can be incorporated into the polysiloxane by reacting the hydroxyl functional group-containing polysiloxane with the low molecular weight carbamate functional material via a "transcarbamoylation" process. The low molecular weight carbamate functional material, which can be derived from an alcohol or glycol ether, can react with free hydroxyl groups of a polysiloxane polyol, that is, material having an average of two or more hydroxyl groups per molecule, yielding a carbamate functional polysiloxane (a) and the original alcohol or glycol ether. Reaction conditions and the ratio of reactants (i), (ii) and (iii) are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example, methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the polysiloxane also can be achieved by reacting isocyanic acid with free hydroxyl groups of the polysiloxane.

As aforementioned, in addition to or in lieu of hydroxyl or carbamate functional groups, the at least one polysiloxane can contain one or more other reactive functional groups such as carboxyl groups, isocyanate groups, blocked isocyanate groups, carboxylate groups, primary or secondary amine groups, amide groups, urea groups, urethane groups, an anhydride group, a hydroxy alkylamide group, epoxy groups, and mixtures of any of the foregoing.

When the at least one polysiloxane (a) contains carboxyl functional groups, the at least one polysiloxane (a) can be prepared by reacting at least one polysiloxane containing hydroxyl functional groups as described above with a polycarboxylic acid or anhydride. Nonlimiting examples of polycarboxylic acids suitable for use include adipic acid, succinic acid, and dodecanedioic acid. Nonlimiting examples of suitable anhydrides include those described above. Reaction conditions and the ratio of reactants are selected so as to form the desired functional groups.

In the case where at least one polysiloxane (a) contains one or more isocyanate functional groups, the at least one polysiloxane can be prepared by reacting at least one polysiloxane containing hydroxyl functional groups, as described above, with a polyisocyanate, such as a diisocyanate. Nonlimiting examples of suitable polyisocyanates include aliphatic polyisocyanates, such as, for example, aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and α,α-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Reaction conditions and the ratio of reactants are selected so as to form the desired functional groups.

The substituent group X in structure (IV) can comprise an oligomeric or polymeric urethane or urea-containing material which is terminated with isocyanate, hydroxyl, primary or secondary amine functional groups, or mixtures of any of the foregoing. When the substituent group X comprises such functional groups, the at least one polysiloxane can be the reaction product of at least one polysiloxane polyol as described above, one or more polyisocyanates and, optionally, one or more compounds having at least two active hydrogen atoms per molecule selected from hydroxyl groups, primary amine groups, and secondary amine groups.

Nonlimiting examples of suitable polyisocyanates are those described above. Nonlimiting examples of compounds having at least two active hydrogen atoms per molecule include polyols and polyamines containing primary or secondary amine groups.

Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A, and the like, or higher polyols such as trimethylolpropane, pentaerythritol and the like. Polyester polyols also can be used. These and other suitable polyols are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both incorporated herein by reference.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, incorporated herein by reference.

In one embodiment, the substituent group X of the structure (IV) can comprise a polymeric ester-containing group which is terminated with hydroxyl or carboxylic acid functional groups. When X is such a group, at least one polysiloxane can be the reaction product of one or more polysiloxane polyols as described above, one or more materials comprising at least one carboxylic acid functional group, and one or more organic polyols. Nonlimiting suitable examples of materials comprising at least one carboxylic acid functional group include carboxylic acid group-containing polymers well-known in the art, for example, carboxylic acid group-containing acrylic polymers, polyester polymers, and polyurethane polymers, such as those described in U.S. Pat. No. 4,681,811. Nonlimiting examples of suitable organic polyols include those described above.

To form the at least one polysiloxane (a) containing epoxy groups, at least one polysiloxane containing hydroxyl functional groups as described above can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer comprising at least one epoxy group, for example glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

In one embodiment, the present invention is directed to coating compositions as previously described wherein the at least one polysiloxane (a), when added to the other components that form the composition, is present in the composition such that the polysiloxane is present in the composition in an amount ranging from 0.01 to 90 weight percent based on total weight of resin solids present in the composition. In another embodiment, the present invention is directed to coating compositions as previously described wherein the at least one polysiloxane, when added to the other components that form the composition, is present in the composition in an amount such that the polysiloxane is present in the composition in an amount from at least 2 weight percent based on total weight of resin solids present in the composition.

In another embodiment, the present invention is directed to coating compositions as previously described wherein the at least one polysiloxane, when added to the other components that form the composition, is present in the composition in an amount such that the polysiloxane is present in the composition in an amount from at least 5 weight percent based on total weight of resin solids present in the composition. In yet another embodiment, the present invention is directed to coating compositions as previously described wherein the at least one polysiloxane, when added to the other components that form the composition, is present in the composition such that the polysiloxane is present in the composition in an amount from at least 10 weight percent based on total weight of resin solids present in the composition.

In one embodiment, the present invention is directed to coating compositions as previously described wherein the at least one polysiloxane, when added to the other components that form the composition, is present in the composition in an amount such that the amount of the polysiloxane present in the composition is less than 90 weight percent based on total weight of resin solids present in the composition. In another embodiment, the present invention is directed to coating compositions as previously described wherein the at least one polysiloxane, when added to the other components that form the composition, is present in the composition in an amount such that the amount of the polysiloxane present in the composition is less than 80 weight percent based on total weight of resin solids present in the composition.

In another embodiment, the present invention is directed to coating compositions as previously described wherein the at least one polysiloxane, when added to the other components that form the composition, is present in the composition in an amount such that the amount of the polysiloxane present in the composition is less than 65 weight percent based on total weight of resin solids present in the composition. In yet another embodiment, the present invention is directed to coating compositions as previously described wherein the at least one polysiloxane, when added to the other components that form the composition, is present in the composition in an amount such that the amount of the polysiloxane is less than 30 weight percent based on total weight of resin solids present in the composition.

As used herein "based on total weight of the resin solids" of the composition means that the amount of the component added during the formation of the composition is based upon the total weight of the resin solids (non-volatiles) of the polysiloxane, any flexibilizing agent comprising at least one functional group, any film-forming component and any curing agent present during the formation of the coating composition, but not including the particles, any solvent, or any additive solids such as hindered amine stabilizers, UV light absorbers, catalysts, pigments including pigment extenders and fillers, and flow modifiers.

As aforementioned, in addition to the at least one polysiloxane (a), the components from which the coating composition is formed comprise component (b) which can be at least one polyol or carbamate functional material which is different from and in addition to components polysiloxane (a) and reactant (c).

It should be understood that the component (b) can be present as a major component in the composition, that is, present as a film-forming material in an amount ranging from 30 to 80 weight percent based on total weight of resin solids present in the composition, alternatively, the component (b) can be present in adjuvant amounts, that is, present in an amount less than 30 weight percent based on total weight of resin solids present in the composition, for example, as a flexibilizing agent in a composition suitable for application to elastomeric substrates.

In one embodiment, the present invention is directed to coating compositions wherein the component (b) can be present in an amount less than 30 weight percent based on the total weight of resin solids in the composition.

Component (b) comprises functional groups, such as those described above with reference to the polysiloxane, which can be reactive with the functional groups of the polysiloxane and/or the functional groups of the at least one reactant (c) as described below. In one embodiment of the present invention, the component (b) comprises at least one reactive functional group selected from a polyol group and a carbamate group. Additionally, the component (b) can contain at least one other reactive functional group selected from an epoxy group, an isocyanate group, a blocked isocyanate group, a carboxylic acid group, and mixtures of any of the foregoing. It should be understood that the functional groups of the component (b) are selected such that the coating compositions of the present invention, when cured, form a coating having a flexibility rating according to a Flexibility Test Method, described below, of at least 6.

Nonlimiting examples of hydroxyl group-containing polymers or polyols suitable for use as the component (b) include acrylic polyols, polyester polyols, polyurethane polyols, polyether polyols, and mixtures of any of the foregoing. In one embodiment of the present invention, the polyol is selected from polyester polyols and polyether polyols.

Suitable hydroxy or carbamate group-containing acrylic polymers can be prepared from polymerizable ethylenically unsaturated monomers and can be copolymers of (meth)

acrylic acid or hydroxylalkyl esters of (meth)acrylic acid with one or more other polymerizable ethylenically unsaturated monomers such as, for example, alkyl esters of (meth)acrylic acid including methyl (meth)acrylate, ethyl (meth)acrylate, butyl (meth)acrylate and 2-ethyl hexylacrylate, and vinyl aromatic compounds such as, for example, styrene, alpha-methyl styrene, and vinyl toluene, wherein at least one of the reactant monomers has polyhydroxy functionality to form a hydroxy functional acrylic polymer or carbamate functionality to produce a carbamate functional acrylic polymer. As used herein, "(meth)acrylate" and like terms are intended to include both acrylates and methacrylates.

The acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid, and an epoxy compound which does not participate in the free radical initiated polymerization with the unsaturated acid monomer. Nonlimiting examples of such epoxy compounds are glycidyl ethers and esters. Nonlimiting examples of suitable glycidyl ethers comprise glycidyl ethers of alcohols and phenols such as butyl glycidyl ether, octyl glycidyl ether, phenyl glycidyl ether and the like. Nonlimiting examples of suitable glycidyl esters include those which are commercially available from Shell Chemical Company under the tradename CARDURA E; and from Exxon Chemical Company under the tradename GLYDEXX-10. Alternatively, the beta-hydroxy ester functional monomers are prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, which is incorporated herein by reference. Carbamate functional groups also can be incorporated into the acrylic polymer by reacting a hydroxyl functional acrylic polymer with a low molecular weight alkyl carbamate such as methyl carbamate. Pendant carbamate groups also can be incorporated into the acrylic polymer by a "transcarbamoylation" reaction in which a hydroxyl functional acrylic polymer is reacted with a low molecular weight carbamate derived from an alcohol or a glycol ether. The carbamate groups can exchange with the hydroxyl groups to yield the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The polymers prepared from polymerizable ethylenically unsaturated monomers can be prepared by solution polymerization techniques, which are well-known to those skilled in the art, in the presence of suitable catalysts such as organic peroxides or azo compounds, for example, benzoyl peroxide or N,N-azobis(isobutylronitrile). The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Hydroxy or carbamate functional polyester polymers also are useful in the compositions of the invention as the component (b). Useful polyester polymers can comprise the condensation products of polyhydric alcohols and polycarboxylic acids. Nonlimiting examples of suitable polyhydric alcohols include ethylene glycol, neopentyl glycol, trimethylol propane, and pentaerythritol. Nonlimiting examples of suitable polycarboxylic acids include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and can include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, which is incorporated herein by reference.

Polyurethane polymers containing terminal isocyanate or hydroxyl groups also can be used as the component (b) in the compositions of the invention. The polyurethane polyols or NCO-terminated polyurethanes which can be used are those prepared by reacting polyols including polymeric polyols with polyisocyanates. Polyureas containing terminal isocyanate or primary or secondary amine groups which also can be used can be those prepared by reacting polyamines including, but not limited to, polymeric polyamines with polyisocyanates. The hydroxyl/isocyanate or amine/isocyanate equivalent ratio can be adjusted and reaction conditions can be selected to obtain the desired terminal groups. Nonlimiting examples of suitable polyisocyanates include those described in U.S. Pat. No. 4,046,729 at column 5, line 26 to column 6, line 28, incorporated herein by reference. Nonlimiting examples of suitable polyols include those described in U.S. Pat. No. 4,046,729 at column 7, line 52 to column 10, line 35, incorporated herein by reference. Nonlimiting examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Nonlimiting examples of suitable polyisocyanates include aromatic isocyanates, such as, for example, 4,4'-diphenylmethane diisocyanate, 1,3-phenylene diisocyanate and toluene diisocyanate, and aliphatic polyisocyanates, such as, for example, 1,4-tetramethylene diisocyanate and 1,6-hexamethylene diisocyanate. Cycloaliphatic diisocyanates, such as, for example, 1,4-cyclohexyl diisocyanate and isophorone diisocyanate can be employed.

Nonlimiting examples of suitable polyether polyols include polyalkylene ether polyols such as those having the following structural formulas (VII) or (VIII):

(VII)

(VIII)

wherein the substituent group R represents hydrogen or a lower alkyl group of 1 to 5 carbon atoms including mixed substituents, n has a value ranging from 2 to 6, and m has a value ranging from 8 to 100 or higher. Nonlimiting examples of polyalkylene ether polyols include poly(oxytetramethylene) glycols, poly(oxytetraethylene) glycols, poly(oxy-1,2-propylene) glycols, and poly(oxy-1,2-butylene) glycols.

Also useful can be polyether polyols formed from oxyalkylation of various polyols, for example, but not limited to, glycols such as, for example, ethylene glycol, 1,6-hexanediol, Bisphenol A, and the like, or other higher polyols such as, for example, trimethylolpropane, pentaerythritol, and the like. Polyols of higher functionality which can be utilized as indicated can be made, for instance, by oxyalkylation of compounds such as sucrose or sorbitol. One oxyalkylation method that can be used is reaction of a polyol with an alkylene oxide, including but not limited to, propylene or ethylene oxide, in the presence of an acidic or basic catalyst. Specific, nonlimiting examples of polyethers include those sold under the names TERATHANE and TERACOL, available from E. I. Du Pont de Nemours and Company, Inc. and POLYMEG® available from QO Chemicals, Inc., a subsidiary of Great Lakes Chemical Corporation of Lafayette, Ind. POLYMEG® 1000 is a preferred polyether diol.

Carbamate functional groups can be introduced onto the polyether polymer by reacting a polyether polyol such as those previously described with urea under reaction conditions well known in the art. Pendent or terminal carbamate functional groups may be incorporated into the polyether polymers by the transcarbamoylation reaction performed as described above.

The polyether polymer generally has a number average molecular weight (Mn) ranging from 500 to 5000, and typically has a Mn ranging from 1100 to 3200.

In one embodiment, the component (b) can have a weight average molecular weight (Mw) ranging from 1000 to 20,000, as determined by gel permeation chromatography using a polystyrene standard. In another embodiment, the Mw of the component (b) ranges from 1500 to 15,000, and can range from 2000 to 12,000, as determined by gel permeation chromatography using a polystyrene standard.

In one embodiment of the present invention, the at least one material (b) is a polyol present in the components from which the coating composition is formed in an amount of less than 30 weight percent on a basis of total resin solids of the components which form the coating composition and has a hydroxyl value ranging from 100 to 200 mg KOH/gram of polyol determined by acetic anhydride esterification according to ASTM-E222. In this embodiment, the amount of polyol generally ranges from 5 to 30 weight percent and can range from 12 to 30 weight percent relative to the total weight of the resin solids of the components which form the composition.

In an alternative embodiment of the present invention, the at least one material comprising at least one functional group is a carbamate functional material. In one embodiment, the carbamate functional material is generally present, when added to the other components which form the coating composition, in an amount of at least 2 percent by weight, can be present in an amount of at least 5 percent by weight, and is typically present in an amount of at least 10 percent by weight based on total weight of resin solids present in the composition. Also the carbamate functional material is generally present, when added to the other components which form the coating composition, in an amount of less than 80 percent by weight, can be present in an amount of less than 70 percent by weight, and is typically present in an amount of less than 65 percent by weight based on total weight of resin solids present in the composition. The amount of the carbamate functional material present in the coating compositions may range between any combination of these values inclusive of the recited values.

As aforementioned, in addition to the components (a) and (b), the components from which the coating composition of the present invention is formed can further comprise (c) at least one reactant comprising at least one functional group that is reactive with at least one functional group selected from the at least one reactive functional group of the at least one polysiloxane (a) and at least one functional group of the at least one component (b), and wherein each component is different.

In one embodiment, the at least one reactant (c) is selected from at least one curing agent. Dependent upon the reactive functional groups of components (a) or (b), this curing agent can be selected from an aminoplast resin, a polyisocyanate, a blocked polyisocyanate compound, a polyepoxide, a polyacid, an anhydride, an amine, a polyol different from the at least one polyol (b), and mixtures of any of the foregoing. In one embodiment, the at least one reactant (c) is selected from an aminoplast resin and a polyisocyanate.

In another embodiment, the present invention is directed to any composition as previously described wherein the curing agent is an aminoplast. Aminoplast resins, which comprise phenoplasts, as curing agents for hydroxyl, carboxylic acid, and carbamate functional group-containing materials are well known in the art. Suitable aminoplasts, such as, for example, those discussed above, are known to those of ordinary skill in the art. Aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

In another embodiment, the present invention is directed to coating compositions as previously described wherein the curing agent comprises an aminoplast resin which, when added to the other components that form the composition, is generally present in an amount ranging from 2 weight percent to 65 weight percent, can be present in an amount ranging from 5 weight percent to 50 weight percent, and typically is present in an amount ranging from 5 weight percent to 40 weight percent based on total weight of resin solids present in the composition.

In yet another embodiment, the present invention is directed to coating compositions as previously described wherein the at least one reactant (c) comprises a polyisocyanate curing agent. As used herein, the term "polyisocyanate" is intended to include blocked (or capped) polyisocyanates as well as unblocked polyisocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. When used, the polyisocyanate curing agent is typically present, when added to the other components which form the coating composition, in an amount ranging from 5 to 65 weight percent, can be present in an amount ranging from 10 to 45 weight percent, and often are present in an amount ranging from 15 to 40 percent by weight based on the total weight of resin solids present in the composition.

Other useful curing agents comprise blocked polyisocyanate compounds such as, for example, the tricarbamoyl triazine compounds described in detail in U.S. Pat. No. 5,084,541, which is incorporated by reference herein. When used, the blocked polyisocyante curing agent can be present, when added to the other components in the composition, in an amount ranging up to 20 weight percent, and can be present in an amount ranging from 1 to 20 weight percent, based on the total weight of resin solids present in the composition.

In one embodiment, the present invention is directed to film-forming compositions as previously described, wherein the at least one reactant (c) comprises as a curing agent both an aminoplast resin and a polyisocyanate.

Anhydrides as curing agents for hydroxyl functional group-containing materials also are well known in the art and can be used in the present invention. Nonlimiting examples of anhydrides suitable for use as curing agents in the compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alpha-methyl styrene, vinyl toluene, and the like. Nonlimiting examples of suitable ethylenically unsaturated carboxylic acid anhydrides include maleic anhydride, citraconic anhydride, and itaconic anhydride. Alternatively, the anhydride can be an anhydride adduct of a diene polymer such as maleinized polybutadiene or a maleinized copolymer of butadiene, for example, a butadiene/styrene copolymer. These and other suitable anhydride curing agents are described in U.S. Pat. No. 4,798,746 at column 10, lines 16–50; and in U.S. Pat. No. 4,732,790 at column 3, lines 41–57, both of which are incorporated herein by reference.

Polyepoxides as curing agents for carboxylic acid functional group-containing materials are well known in the art. Nonlimiting examples of polyepoxides suitable for use in the compositions of the present invention comprise polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58, which is incorporated herein by reference.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer which is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Also well known in the art as curing agents for isocyanate functional group-containing materials are polyols, that is, materials having two or more hydroxyl groups per molecule, different from component (b) when component (b) is a polyol. Nonlimiting examples of such materials suitable for use in the compositions of the invention include polyalkylene ether polyols, including thio ethers; polyester polyols, including polyhydroxy polyesteramides; and hydroxyl-containing polycaprolactones and hydroxy-containing acrylic copolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both of which are incorporated herein by reference.

Polyamines also can be used as curing agents for isocyanate functional group-containing materials. Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-porphylene diamine, 1,8-octane diamine, isophorone diamine, propane-2,2-cyclohexyl amine, and the like. Nonlimiting examples of suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, which is incorporated herein by reference.

When desired, appropriate mixtures of curing agents may be used. It should be mentioned that compositions can be formulated as a one-component composition where a curing agent such as an aminoplast resin and/or a blocked polyisocyanate compound such as those described above is admixed with other composition components. The one-component composition can be storage stable as formulated. Alternatively, compositions can be formulated as a two-component composition where a polyisocyanate curing agent such as those described above can be added to a pre-formed admixture of the other composition components just prior to application. The pre-formed admixture can comprise curing agents such as aminoplast resins and/or blocked polyisocyanate compounds such as those described above.

In another embodiment in which the coating is cured by actinic radiation or the combination of actinic radiation and thermal energy, the components from which the coating composition are formed further can comprise at least one photoinitiator or photosensitizer which provides free radicals or cations to initiate the polymerization process. Useful photoinitiators have an adsorption in the range of 150 to 2,000 nm. Non-limiting examples of useful photoinitiators include benzoin, benzophenone, hydroxy benzophenone, anthraquinone, thioxanthone, substituted benzoins such as butyl isomers of benzoin ethers, α,α-diethoxyacetophenone, α,α-dimethoxy-α-phenylacetophenone, 2-hydroxy-2-methyl-1-phenyl propane 1-one and 2,4,6-trimethyl benzoyl diphenyl phosphine oxide.

In an alternative embodiment, the reactant can comprise at least one material which has at least one reactive functional group which is blocked with a silyl group. This silyl-blocked material is different from the polysiloxane (a) discussed above. Hydrolysis of the silyl group regenerates the reactive functional group on the material which is available for further reaction with the curing agent.

Preferred silyl blocking groups can have the following structure (IX):

wherein each $R_1$, $R_2$ and $R_3$, which may be identical or different, represents an alkyl group having from 1 to 18 carbon atoms, a phenyl group or an allyl group.

Non-limiting examples of suitable functional groups which can be blocked by the silyl group comprise hydroxyl groups, carbamate groups, carboxyl groups, amide groups and mixtures thereof. In one embodiment, the functional groups are hydroxyl groups.

Non-limiting examples of suitable compounds which can be reacted with the functional group to form the silyl group comprise hexamethyldisilazane (preferred), trimethylchlorosilane, trimethylsilyidiethylamine, t-butyl dimethylsilyl chloride, diphenyl methylsilyl chloride, hexamethyl disilylazide, hexamethyl disiloxane, trimethylsilyl triflate, hexamethyldisilyl acetamide, N,N'-bis[trimethylsilyl]-urea, and mixtures of any of the foregoing.

Further examples of suitable compounds for silylation reactions, and suitable reaction conditions and reagents for trimethylsilylation reactions are discussed in Example 28 below and in IT. Greene et al., *Protective Groups in Organic Synthesis*, (2d. ed. 1991) at pages 68–86 and 261–263, which are incorporated herein by reference.

The backbone of the material can be a compound which comprises at least one linkage selected from an ester linkage, a urethane linkage, a urea linkage, an amide linkage, a siloxane linkage, and an ether linkage or a polymer such as a polyester, an acrylic polymer, a polyurethane, a polyether, a polyurea, a polyamide, and copolymers of any of the foregoing.

Suitable compounds or polymers having at least one ester linkage and at least one reactive functional group include half-esters formed from reacting at least one polyol with at least one 1,2-anhydride or acid functional polyesters derived from polyols and polyacids or anhydrides, as described in U.S. Pat. No. 5,256,452 at column 5, line 29 through column 8, line 6, which portion is incorporated herein by reference. The half-esters are suitable because they are of relatively low molecular weight and are quite reactive with epoxy functionality.

The half-ester is obtained, for example, by reaction between a polyol and a 1,2-anhydride under conditions sufficient to ring open the anhydride forming the half-ester with substantially no polyesterification occurring. Such reaction products are of relatively low molecular weight with narrow molecular weight distributions and low viscosity. By "substantially no polyesterification occurring" means that the carboxyl groups formed by the reaction of the anhydride are not further esterified by the polyol in a recurring manner. Further to this embodiment less than 10, and typically less than 5 weight percent of high molecular weight polyester is formed based on the resin solids of the components which form the coating composition.

The 1,2-anhydride and polyol can be mixed together and the reaction can be conducted in the presence of an inert atmosphere such as nitrogen and a solvent such as a ketone or aromatic hydrocarbon to dissolve the solid ingredients and/or lower the viscosity of the reaction mixture.

In one embodiment, for the desired ring opening reaction and half-ester formation, a 1,2-dicarboxylic anhydride can be used. Reaction of a polyol with a carboxylic acid instead of an anhydride would require esterification by condensation and elimination of water by distillation, and such conditions would promote undesired polyesterification. According to the present invention, the reaction temperature can be low, i.e., less than 135° C. and typically ranging from 70° C. to 135° C. The time of reaction can vary somewhat depending upon the temperature of reaction, and generally ranges from 10 minutes to 24 hours.

The equivalent ratio of anhydride to hydroxyl on the polyol can be at least 0.8:1 (the anhydride being considered monofunctional) to obtain maximum conversion to the desired half-ester. Ratios less than 0.8:1 can be used but such ratios may result in increased formation of lower functionality half-esters.

Useful anhydrides include aliphatic, cycloaliphatic, olefinic, cycloolefinic and aromatic anhydrides. Substituted aliphatic and aromatic anhydrides also are useful provided the substituents do not adversely affect the reactivity of the anhydride or the properties of the resultant polyester. Examples of substituents include chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride (preferred), tetrachlorophthalic anhydride, endomethylene tetrahydrophthalic anhydride, chlorendic anhydride, itaconic anhydride, citraconic anhydride and maleic anhydride.

Among the polyols which can be used are simple polyols, that is, those containing from 2 to 20 carbon atoms, as well as polymeric polyols such as polyester polyols, polyurethane polyols and acrylic polyols.

Among the simple polyols which can be used are diols, triols, tetrols and mixtures thereof. Examples of suitable polyols include those containing from 2 to 10 carbon atoms such as aliphatic polyols. Specific examples include but are not limited to the following compositions: di-trimethylol propane (bis(2,2-dimethylol)dibutylether); pentaerythritol; 1,2,3,4-butanetetrol; sorbitol; trimethylolpropane; trimethylolethane; 1,2,6-hexanetriol; glycerine; trishydroxyethyl isocyanurate; dimethylol propionic acid; 1,2,4-butanetriol; 2-ethyl-1,3-hexanediol; TMP/epsilon-caprolactone triols; ethylene glycol; 1,2-propanediol; 1,3-propanediol; 1,4-butanediol; 1,5-pentanediol; 1,6-hexanediol; neopentyl glycol; diethylene glycol; dipropylene glycol; 1,4-cyclohexanedimethanol and 2,2,4-trimethylpentane-1,3 diol.

With regard to oligomeric polyols, suitable polyols which can be used are polyols made from reaction of diacids with triols, such as trimethylol propane/cyclohexane diacid and trimethylol propane/adipic acid.

With regard to polymeric polyols, the polyester polyols can be prepared by esterification of an organic polycarboxylic acid or anhydride thereof with organic polyols and/or an epoxide. Usually, the polycarboxylic acids and polyols are aliphatic or aromatic dibasic acids or acid anhydrides and diols.

The polyols which can be employed in making the polyester include trimethylol propane, di-trimethylol propane, alkylene glycols such as ethylene glycol, neopentyl glycol and other glycols such as hydrogenated bisphenol A, cyclohexanediol, cyclohexanedimethanol, the reaction products of lactones and diols, for example, the reaction product of epsilon-caprolactone and ethylene glycol, hydroxyalkylated bisphenols, polyester glycols, for example, poly(oxytetramethylene)glycol and the like.

The acid component of the polyester comprises monomeric carboxylic acids or anhydrides having 2 to 18 carbon atoms per molecule. Among the acids which can be used are phthalic acid, isophthalic acid, terephthalic acid, tetrahydrophthalic acid, hexahydrophthalic acid, methylhexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid.

Besides the polyester polyols formed from polybasic acids and polyols, polylactone-type polyesters also can be employed. These products can be formed from the reaction of a lactone such as epsilon-caprolactone and a polyol such as ethylene glycol, diethylene glycol and trimethylolpropane.

Besides polyester polyols, polyurethane polyols such as polyester-urethane polyols which can be formed from reacting an organic polyisocyanate with a polyester polyol such as those described above can be used. The organic polyisocyanate can be reacted with a polyol so that the OH/NCO equivalent ratio is greater than 1:1 so that the resultant product contains free hydroxyl groups. The organic polyisocyanate which can be used in preparing the polyurethane polyols can be an aliphatic or aromatic polyisocyanate or a mixture. Diisocyanates are preferred, although higher polyisocyanates such as triisocyanates can be used, but they do result in higher viscosities.

Examples of suitable diisocyanates include 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates include polymethylene polyphenol isocyanates.

At least a portion, and in certain instances all of the acid functional groups can be silylated. Alternatively at least a portion, and in certain instances all of the acid functional groups can be converted to hydroxyl groups by reaction with an epoxide. In certain embodiments the epoxide is a monofunctional epoxide such as ethylene oxide, butylene oxide, propylene oxide, cyclohexane oxide, glycidyl ethers, and glycidyl esters and then silylated. The equivalent ratio of epoxy groups to acid groups on the ester generally ranges from 0.1:1 to 2:1, can range from 0.5:1 to 1:1, and typically ranges from 0.8:1 to 1:1. In another embodiment, an aliphatic diol, such a 1,2-propanediol, can be used in place of the epoxide.

Useful aliphatic diols include diols containing a primary hydroxyl such as 1,2-propanediol, 1,3-propanediol, 1,2-butanediol, 1,3-butanediol, 1,2-pentanediol, 1,4-pentanediol, 1,2-hexanediol, 1,5-hexanediol, 2-ethyl-1,3-hexanediol, diethylene glycol, dipropylene glycol, 1,4-cyclohexanedimethanol, 2,2,4-trimethyl-1,3-pentanediol, and 3,3-dimethyl-1,2-butanediol.

In one embodiment, the coating compositions of the present invention comprise a compound having the following structure (X):

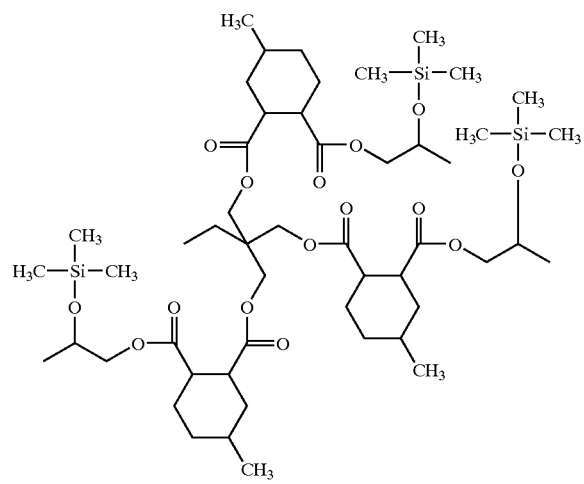

Other useful materials having a linkage selected from an ester linkage, a urethane linkage, a urea linkage, an amide linkage, a siloxane linkage, and an ether linkage and at least one reactive functional group which are suitable for silylation are disclosed above in the discussion of suitable additional polymers.

Alternatively, useful reactants include acrylic polymers containing hydroxyl groups blocked with hydrolyzable siloxy groups (polymerized for example from vinyl monomers and trimethyl siloxy methylmethacrylate) such as are disclosed in 1. Azuma et al., "Acrylic Oligomer for High Solid Automotive Top Coating System Having Excellent Acid Resistance", *Progress in Organic Coatings* 32 (1997) 1–7, which is incorporated herein by reference.

In one embodiment, the present invention is directed to any composition as previously described wherein the silyl-blocked reactant, when added to the other components which form the coating composition, is present in the coating composition in an amount ranging from 0.1 to 90 weight percent based on total weight of the resin solids of the components which form the coating composition. In another embodiment, the present invention is directed to any composition as previously described wherein the silyl-blocked reactant, when added to the other components which form the coating composition, is generally present in the coating composition in an amount of at least 0.1 weight percent, can be present in the coating composition in an amount of at least 1 weight percent, and is usually present in an amount of at least 5 weight percent based on total weight of the resin solids of the components which form the coating composition.

In yet another embodiment, the present invention is directed to any composition as previously described wherein the silyl-blocked reactant, when added to the other components which form the coating composition, is generally present in the coating composition in an amount less than 60 weight percent, can be present in the coating composition in an amount less than 30 weight percent, and is typically present in the coating composition in an amount less than 10 weight percent based on total weight of the resin solids of the components which form the coating composition. The amount of silyl-blocked reactant present in the coating compositions may range between any combination of these values inclusive of the recited values.

In a further embodiment, the present invention is directed to coating compositions as previously described comprising at least one film forming material. This film forming material can be a polymer different from and in addition to the at least one polysiloxane (a), the material (b), and the at least one reactant (c). This film-forming polymer can have at least one functional group reactive with at least one functional group selected from the at least one reactive functional group of the at least one polysiloxane (a), at least one functional group of the at least one component (b), and the at least one functional group of the reactant (c). In one embodiment, this at least one additional polymer can have at least one reactive functional group selected from a hydroxyl group, a carbamate group, an epoxy group, an isocyanate group, and a carboxyl group. In another embodiment, the polymer can have at least one reactive functional group selected from a hydroxyl group, and a carbamate group.

The film forming material may contain one or more reactive functional groups selected from hydroxyl groups, carbamate groups, epoxy groups, isocyanate groups, carboxylic acid groups, and mixtures of any of the foregoing.

Nonlimiting examples of suitable film-forming polymers suitable for use as the at least one film-forming (c) include those described above with reference to the polyol or carbamate functional material (b).

The coating compositions of the present invention can be solvent-based compositions, water-based compositions, in solid particulate form, that is, a powder composition, in the form of a powder slurry or an aqueous dispersion. The components of the present invention used to form the compositions of the present invention can be dissolved or dispersed in an organic solvent. Nonlimiting examples of suitable organic solvents include alcohols, such as butanol; ketones, such as methyl amyl ketone; aromatic hydrocarbons, such as xylene; and glycol ethers, such as, ethylene glycol monobutyl ether; esters; other solvents; and mixtures of any of the foregoing.

In solvent based compositions, the organic solvent is generally present in amounts ranging from 5 to 80 percent by weight based on total weight of the resin solids of the components which form the composition, and can be present in an amount ranging from 30 to 50 percent by weight. The compositions as described above can have a total solids content ranging from 40 to 75 percent by weight based on total weight of the resin solids of the components which form the composition, and can have a total solids content ranging from 50 to 70 percent by weight. Alternatively, the inventive compositions can be in solid particulate form suitable for use as a powder coating, or suitable for dispersion in a liquid medium such as water for use as a powder slurry.

In a further embodiment, the film-forming compositions as previously described further comprise a catalyst which is present during the composition's formation. In one embodiment, the catalyst is present in an amount sufficient to accelerate the reaction between at least one reactive functional group of the at least one reactant (c) and/or at least one reactive functional group of the at least one polysiloxane (a).

Nonlimiting examples of suitable catalysts include acidic materials, for example, acid phosphates, such as phenyl acid phosphate, and substituted or unsubstituted sulfonic acids such as dodecylbenzene sulfonic acid or para-toluene sulfonic acid. Non-limiting examples of suitable catalysts for reactions between isocyanate groups and hydroxyl groups include tin catalysts such as dibutyl tin dilaurate. Non-limiting examples of epoxy acid base catalysts include tertiary amines such as N,N'-dimethyldodecyl amine catalysts. In another embodiment, the catalyst can be a phosphatized polyester or a phosphatized epoxy. In this embodiment, the catalyst can be, for example, the reaction product of phosphoric acid and a bisphenol A diglycidyl ether having two hydrogenated phenolic rings, such as DRH-151, which is commercially available from Shell Chemical Co. The catalyst can be present, when added to the other components that form the composition, in an amount ranging from 0.1 to 5.0 percent by weight, and is typically present in an amount ranging from 0.5 to 1.5 percent by weight based on the total weight of resin solids present in the composition.

In another embodiment, additional components can be present during the formation of the compositions as previously described. These additional components include, but are not limited to, particles different from components (a), (b) and (c), flexibilizers, plasticizers, surface active agents, thixotropic agents, rheology control modifiers, anti-gassing agents, organic cosolvents, flow controllers, hindered amine light stabilizers, anti-oxidants, UV light absorbers, coloring agents or tints, and similar additives conventional in the art, as well as mixtures of any of the foregoing can be included in the composition. These additional ingredients can be present, when added to the other components that form the composition, in an amount up to 40 percent by weight based on the total weight of resin solids present in the composition.

In one embodiment, the present invention is directed to compositions as previously described wherein the composition further comprises a plurality of particles. In another embodiment, the present invention is directed to any composition as previously described wherein the particles have an average particle size of less than 100 microns prior to incorporation into the composition. In another embodiment, the present invention is directed to any composition as previously described wherein the particles have an average particle size ranging from 1 to less than 1000 nanometers prior to incorporation into the composition. In yet another embodiment, the present invention is directed to any composition as previously described wherein the particles have an average particle size ranging from 1 to 100 nanometers prior to incorporation into the composition.

In another embodiment, the present invention is directed to any composition as previously described wherein the particles have an average particle size ranging from 5 to 50 nanometers prior to incorporation into the composition. In another embodiment, the present invention is directed to any composition as previously described wherein the particles have an average particle size ranging from 5 to 25 nanometers prior to incorporation into the composition.

In an embodiment where the average particle size of the particles is greater than one micron, the average particle size can be measured according to known laser scattering techniques. For example, the average particle size of such particles is measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In an embodiment of the present invention wherein the size of the particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image, and a description of one such method is disclosed in the examples set forth below. In one nonlimiting embodiment of the present invention, a TEM image with 105,000× magnification is produced, and a conversion factor is obtained by dividing the magnification by 1000. Upon visual inspection, the diameter of the particles is measured in millimeters, and the measurement is converted to nanometers using the conversion factor. The diameter of the particle refers to the smallest diameter sphere that will completely enclose the particle.

The shape (or morphology) of the particles can vary depending upon the specific embodiment of the present invention and its intended application. For example generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), *Handbook of Fillers and Plastics* (1987) at pages 9–10, which are specifically incorporated by reference herein.

It will be recognized by one skilled in the art that mixtures of one or more particles having different average particle sizes can be incorporated into the compositions in accordance with the present invention to impart the desired properties and characteristics to the compositions. For example, particles of varying particle sizes can be used in the compositions according to the present invention.

The particles can be formed from materials selected from polymeric and nonpolymeric inorganic materials, polymeric and nonpolymeric organic materials, composite materials, and mixtures of any of the foregoing. As used herein, the term "polymeric inorganic material" means a polymeric material having a backbone repeat unit based on an element or elements other than carbon. For more information see James Mark et al., *Inorganic Polymers*, Prentice Hall Polymer Science and Engineering Series, (1992) at page 5, which is specifically incorporated by reference herein. As used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example, calcium carbonate and sodium carbonate. See R. Lewis, Sr., *Hawley's Condensed Chemical Dictionary*, (12th Ed. 1993) at pages 761–762, and M. Silberberg, Chemistry *The Molecular Nature of Matter and Change* (1996) at page 586, which are specifically incorporated by reference herein.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, *Handbook of Fillers*, 2nd Ed. (1999) at pages 15–202, which are specifically incorporated by reference herein.

The particles suitable for use in the compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example, boron nitride; specific, nonlimiting examples of metal oxides are, for example, zinc oxide; nonlimiting examples of suitable metal sulfides are, for example, molybdenum disulfide, tantalum disulfide, tungsten disulfide, and zinc sulfide; nonlimiting suitable examples of metal silicates are, for example, aluminum silicates and magnesium silicates such as vermiculite.

The particles can comprise, for example, a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the composition of the invention is employed as a transparent topcoat, for example, as a clearcoat in a multi-component composite coating composition, particles should not seriously interfere with the optical properties of the composition. As used herein, "transparent" means that the cured coating has a BYK Haze index of less than 50 as measured using a BYK/Haze Gloss instrument.

Nonpolymeric, inorganic materials useful in forming the particles of the present invention comprise inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include niolybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In one embodiment, the present invention is directed to any composition as previously described wherein the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing. In another embodiment, the present invention is directed to any composition as previously described wherein the particles include colloidal silica. As disclosed above, these materials can be surface treated or untreated.

The composition can comprise precursors suitable for forming silica particles in situ by a sol-gel process. The composition according to the present invention can comprise alkoxy silanes which can be hydrolyzed to form silica particles in situ. For example, tetraethylortho silicate can be hydrolyzed with an acid such as hydrochloric acid and condensed to form silica particles. Other useful particles include surface-modified silicas such as are described in U.S. Pat. No. 5,853,809 at column 6, line 51 to column 8, line 43, which is incorporated herein by reference.

In one embodiment of the present invention, the particles have a hardness value greater than the hardness value of materials that can abrade a polymeric coating or a polymeric substrate. Examples of materials that can abrade the polymeric coating or polymeric substrate include, but are not limited to, dirt, sand, rocks, glass, carwash brushes, and the like. The hardness values of the particles and the materials that can abrade the polymeric coating or polymeric substrate can be determined by any conventional hardness measurement method, such as Vickers or Brinell hardness, but is preferably determined according to the original Mohs' hardness scale which indicates the relative scratch resistance of the surface of a material on a scale of one to ten. The Mohs' hardness values of several nonlimiting examples of particles formed from inorganic materials suitable for use in the present invention are given in Table A below.

TABLE A

| Particle material | Mohs' hardness (original scale) |
|---|---|
| Boron nitride | $2^1$ |
| Graphite | $0.5–1^2$ |
| Molybdenum disulfide | $1^3$ |
| Talc | $1–1.5^4$ |
| Mica | $2.8–3.2^5$ |
| Kaolinite | $2.0–2.5^6$ |
| Gypsum | $1.6–2^7$ |
| Calcite (calcium carbonate) | $3^8$ |
| Calcium fluoride | $4^9$ |
| zinc oxide | $4.5^{10}$ |
| Aluminum | $2.5^{11}$ |
| Copper | $2.5–3^{12}$ |
| Iron | $4–5^{13}$ |
| Gold | $2.5–3^{14}$ |
| Nickel | $5^{15}$ |
| Palladium | $4.8^{16}$ |
| Platinum | $4.3^{17}$ |
| Silver | $2.5–4^{18}$ |
| Zinc sulfide | $3.5–4^{19}$ |

[1] K. Ludema, Friction, Wear, Lubrication, (1996) at page 27, which is hereby incorporated by reference.
[2] R. Weast (Ed.), Handbook of Chemistry and Physics, CRC Press (1975) at page F-22.
[3] R. Lewis, Sr., Hawley's condensed Chemical Dictionary, (12th Ed. 1993) at page 793, which is hereby incorporated by reference.
[4] Hawley's Condensed Chemical Dictionary, (12th Ed. 1993) at page 1113, which is hereby incorporated by reference.
[5] Hawley's Condensed Chemical Dictionary, (12th Ed. 1993) at page 784, which is hereby incorporated by reference.
[6] Handbook of Chemistry and Physics at page F-22.
[7] Handbook of Chemistry and Physics at page F-22.
[8] Friction, Wear, Lubrication at page 27.
[9] Friction, Wear, Lubrication at page 27.
[10] Friction, Wear, Lubrication at page 27.
[11] Friction, Wear, Lubrication at page 27.
[12] Handbook of Chemistry and Physics at page F-22.
[13] Handbook of Chemistry and Physics at page F-22.
[14] Handbook of Chemistry and Physics at page F-22.
[15] Handbook of Chemistry and Physics at page F-22.
[16] Handbook of Chemistry and Physics at page F-22.
[17] Handbook of Chemistry and Physics at page F-22.
[18] Handbook of Chemistry and Physics at page F-22.
[19] R. Weast (Ed.), Handbook of Chemistry and Physics, CRC Press (71st Ed. 1990) at page 4–158.

In one embodiment, the Mohs' hardness value of the particles is greater than 5. In certain embodiments, the Mohs' hardness value of the particles, such as silica, is greater than 6.

As mentioned above, the Mohs' hardness scale relates to the resistance of a material to scratching. The present invention therefore further contemplates particles that have a hardness at their surface that is different from the hardness of the internal portions of the particle beneath its surface. More specifically, and as discussed above, the surface of the particle can be modified in any manner well known in the art, including, but not limited to, chemically changing the particle's surface characteristics using techniques known in the art such that the surface hardness of the particle is greater the hardness of the materials that can abrade the polymeric coating or polymeric substrate while the hardness of the particle beneath the surface is less than the hardness of the materials that can abrade the polymeric coating or polymeric substrate.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material such as silicon carbide or aluminum nitride can be provided with a silica, carbonate or nanoclay coating to form a useful composite particle. In another nonlimiting example, a silane coupling agent with alkyl side chains can interact with the surface of an inorganic particle formed from an inorganic oxide to provide a useful composite particle having a "softer" surface. Other examples include cladding, encapsulating or coating particles formed from nonpolymeric or polymeric materials with differing nonpolymeric or polymeric materials. A specific nonlimiting example of such composite particles is DUALITE™, which is a synthetic polymeric particle coated with calcium carbonate that is commercially available from Pierce and Stevens Corporation of Buffalo, N.Y.

In one nonlimiting embodiment of the invention, the particles are formed from solid lubricant materials. As used herein, the term "solid lubricant" means any solid used between two surfaces to provide protection from damage during relative movement or to reduce friction and wear. In one embodiment, the solid lubricants are inorganic solid lubricants. As used herein, "inorganic solid lubricant" means that the solid lubricants have a characteristic crystalline habit which causes them to shear into thin, flat plates which readily slide over one another and thus produce an antifriction lubricating effect. See R. Lewis, Sr., *Hawley's Condensed Chemical Dictionary*, (12th Ed. 1993) at page 712, which is specifically incorporated by reference herein. Friction is the resistance to sliding one solid over another. F. Clauss, *Solid Lubricants and Self-Lubricating Solids* (1972) at page 1, which is specifically incorporated by reference herein.

In one nonlimiting embodiment of the invention, the particles have a lamellar structure. Particles having a lamellar structure are composed of sheets or plates of atoms in hexagonal array, with strong bonding within the sheet and weak van der Waals bonding between sheets, providing low shear strength between sheets. A nonlimiting example of a lamellar structure is a hexagonal crystal structure. Inorganic solid particles having a lamellar fullerene (i.e., buckyball) structure also are useful in the present invention.

Nonlimiting examples of suitable materials having a lamellar structure that are useful in forming the particles of the present invention include boron nitride, graphite, metal dichalcogenides, mica, talc, gypsum, kaolinite, calcite, cadmium iodide, silver sulfide, and mixtures of any of the foregoing. Suitable metal dichalcogenides include molybdenum disulfide, molybdenum diselenide, tantalum disulfide, tantalum diselenide, tungsten disulfide, tungsten diselenide, and mixtures of any of the foregoing.

The particles can be formed from nonpolymeric, organic materials. Nonlimiting examples of nonpolymeric, organic materials useful in the present invention include, but are not limited to, stearates (such as zinc stearate and aluminum stearate), diamond, carbon black, and stearamide.

The particles can be formed from inorganic polymeric materials. Nonlimiting examples of useful inorganic polymeric materials include polyphosphazenes, polysilanes, polysiloxane, polygeremanes, polymeric sulfur, polymeric selenium, silicones, and mixtures of any of the foregoing. A specific, nonlimiting example of a particle formed from an inorganic polymeric material suitable for use in the present invention is TOSPEARL[20], which is a particle formed from cross-linked siloxanes and is commercially available from Toshiba Silicones Company, Ltd. of Japan.

The particles can be formed from synthetic, organic polymeric materials. Nonlimiting examples of suitable organic polymeric materials include, but are

[20] See R. J. Perry "Applications for Cross-Linked Siloxane Particles" *Chemtech*, February 1999 at pages 39–44.

not limited to, thermoset materials and thermoplastic materials. As used herein, a "thermoplastic" material is a material that softens when exposed to heat and returns to its original condition when cooled to room temperature. Nonlimiting examples of suitable thermoplastic materials include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

Nonlimiting examples of suitable thermoset materials include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle. As used herein, a "thermoset" material is a material that material solidifies or "sets" irreversibly when heated. A thermoset material has formed a crosslinked network. As used herein, a polymeric material is "crosslinked" if it at least partially forms a polymeric network. One skilled in the art will understand that the presence and degree of crosslinking (crosslink density) can be determined by a variety of methods, such as dynamic mechanical thermal analysis (DMTA) using a TA Instruments DMA 2980 analyzer conducted under nitrogen such as is described above. This method determines the glass transition temperature and crosslink density of free films of coatings or polymers. These physical properties of a cured material are related to the structure of the crosslinked network.

The particles also can be hollow particles formed from materials selected from polymeric and nonpolymeric inorganic materials, polymeric and nonpolymeric organic materials, composite materials, and mixtures of any of the foregoing. Nonlimiting examples of suitable materials from which the hollow particles can be formed are described above.

In an embodiment of the present invention, the at least one polysiloxane (a) is nonreactive with the particles.

In one embodiment, the present invention is directed to any composition as previously described wherein the particles, when added to the other components that form the composition, are present in the composition in an amount ranging from 0.01 to 75 weight percent based on the total weight of the resin solids of the components which form the composition. In another embodiment, the present invention is directed to any composition as previously described wherein the particles, when added to the other components that form the composition, are present in the composition in an amount of at least 0.1 weight percent, can be present in the composition in an amount greater than 0.5 weight percent, and are typically present in the composition in an amount greater than 5 weight percent based on the total weight of the resin solids of the components which form the composition.

In yet another embodiment, the present invention is directed to any composition as previously described wherein, the particles, when added to the other components of the composition, are present in the composition in an amount less than 75 weight percent, can be present in the composition in an amount less than 50 weight percent, can be present in the composition in an amount less than 20 weight percent, and are typically present in the composition in an amount less than 10 weight percent based on the total weight of the resin solids of the components which form the composition. The amount of the particles present in the compositions may range between any combination of these values inclusive of the recited values.

Prior to incorporation, one class of particles which can be used according to the present invention includes sols, such as an organosol, of the particles. These sols can be of a wide variety of small-particle, colloidal silicas having an average particle size in ranges such as identified above.

The colloidal silicas can be surface modified during or after the particles are initially formed. These surface modified silicas may contain on their surface chemically bonded carbon-containing moieties, as well as such groups as anhydrous $SiO_2$ groups and SiOH groups, various ionic groups physically associated or chemically bonded within the surface of the silica, adsorbed organic groups, or combinations of any of the foregoing, depending on the characteristics of the particular silica desired. Such surface modified silicas are described in detail in U.S. Pat. No. 4,680,204, which is incorporated herein by reference.

Such materials can be prepared by a variety of techniques in various forms, nonlimiting examples comprise organosols and mixed sols. As used herein the term "mixed sols" is intended to include those dispersions of colloidal silica in which the dispersing medium comprises both an organic liquid and water. Such small particle colloidal silicas are readily available, are essentially colorless and have refractive indices which permit their inclusion in compositions that, without additional pigments or components known in the art to color or decrease the transparency of such compositions, result in colorless, transparent coatings.

Suitable nonlimiting examples of particles include colloidal silicas, such as those commercially available from Nissan Chemical Company under the trademark ORGANOSILICASOLS™ such as ORGANOSILICASOL™ MT-ST, and from Clariant Corporation as HIGHLINK™; colloidal aluminas, such as those commercially available from Nalco Chemical under the trademark NALCO 8676®; and colloidal zirconias, such as those commercially available from Nissan Chemical Company under the trademark HIT-32M®.

The particles can be incorporated into the compositions of the invention in the form of a stable dispersion. When the particles are in a colloidal form, the dispersions can be prepared by dispersing the particles in a carrier under agitation and solvent that is present can be removed under vacuum at ambient temperatures. In certain embodiments, the carrier can be other than a solvent, such as the surface active agents described in detail below, including, but not limited to a polysiloxane containing reactive functional groups, including, but not limited to, the at least one polysiloxane (a).

Alternatively, the dispersions can be prepared as described in U.S. Pat. Nos. 4,522,958 or 4,526,910, which are incorporated by reference herein. The particles can be "cold-blended" with the at least one polysiloxane (a) prior to incorporation into the inventive compositions. Alternatively, the particles can be post-added to an admixture of any remaining composition components (including, but not limited to, the at least one polysiloxane (a)) and dispersed therein using dispersing techniques well-known in'the art.

When the particles are in other than colloidal form, for example, but not limited to, agglomerate form, the dispersions can be prepared by dispersing the agglomerate in the carrier, for example, but not limited to, the at least one polysiloxane (a), to stably disperse the particles therein. Dispersion techniques such as grinding, milling, microfluidizing, ultrasounding, or any other pigment dispersing techniques well known in the art of coatings formulation can be used. Alternatively, the particles can be dispersed by any other dispersion techniques known in the art. If desired, the particles in other than colloidal form can be post-added to an admixture of other composition components and dispersed therein using any dispersing techniques known in the art.

The particles can be present in a dispersion, suspension or emulsion in a carrier. Nonlimiting examples of suitable carriers include, but are not limited to, water, solvents, surfactants, or a mixture of any of the foregoing.

In yet another embodiment of the present invention, at least one adjuvant surface active agent can be present during the formation of the compositions as previously described. Further, as used herein, by "surface active agent" is meant any material which tends to lower the solid surface tension or surface energy of the "cured" composition or coating. That is, the cured composition or coating formed from a composition comprising a surface active agent has a lower solid surface tension or surface energy than a cured coating formed from the analogous composition which does not contain the surface active agent.

For purposes of the present invention, solid surface tension can be measured according to the Owens-Wendt method using a Rame'-Hart Contact Angle Goniometer with distilled water and methylene iodide as reagents. Generally, a 0.02 cc drop of one reagent is placed upon the cured coating surface and the contact angle and its complement are measured using a standard microscope equipped with the goniometer. The contact angle and its complement are measured for each of three drops. The process is then repeated using the other reagent. An average value is calculated for the six measurements for each of the reagents. The solid surface tension is then calculated using the Owens-Wendt equation:

$$\{\gamma_l(1+\cos \Phi)\}/2=(\gamma_l^d \gamma_s^d)^{1/2}+(\gamma_l^p \gamma_s^p)^{1/2}$$

where $\gamma_l$ is the surface tension of the liquid (methylene iodide=50.8, distilled water=72.8) and $\gamma^d$ and $\gamma^p$ are the dispersion and polar components (methylene iodide $\gamma^d$=49.5, $\gamma^p$=1.3; distilled water $\gamma^d$=21.8, $\gamma^p$=51.0); the values for $\Phi$ measured and the cos $\Phi$ determined. Two equations are then setup, one for methylene iodide and one for water. The only unknowns are $\gamma_s^d$ and $\gamma_s^p$. The two equations are then solved for the two unknowns. The two components combined represent the total solid surface tension.

The at least one adjuvant surface active agent can be selected from amphiphilic, reactive functional group-containing polysiloxanes such as are described above, amphiphilic fluoropolymers, and mixtures of any of the foregoing. With reference to water-soluble or water-dispersible amphiphilic materials, the term "amphiphilic" means a polymer having a generally hydrophilic polar end and a water-insoluble generally hydrophobic end. Nonlimiting examples of suitable functional group-containing polysiloxanes for use as surface active agents include those polysiloxanes described above. Nonlimiting examples of suitable amphiphilic fluoropolymers include fluoroethylene-alkyl vinyl ether alternating copolymers (such as those described in U.S. Pat. No. 4,345,057) available from Asahi Glass Company under the tradename LUMIFLON; fluorosurfactants, such as the fluoroaliphatic polymeric esters commercially available from 3M of St. Paul, Minn. under the tradename FLUORAD; functionalized perfluorinated materials, such as 1H,1H-perfluoro-nonanol commercially available from FluoroChem USA; and perfluorinated (meth)acrylate resins.

Nonlimiting examples of other adjuvant surface active agents suitable for use in the composition or coating of the present invention can include anionic, nonionic and cationic surface active agents.

Nonlimiting examples of suitable anionic surface active agents include sulfates or sulfonates. Specific nonlimiting examples include higher alkyl mononuclear aromatic sulfonates such as the higher alkyl benzene sulfonates containing from 10 to 16 carbon atoms in the alkyl group and a straight- or branched-chain, e.g., the sodium salts of decyl, undecyl, dodecyl, tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate. Other nonlimiting examples of suitable anionic surface active agents include olefin sulfonates, including long chain alkenylene sulfonates, long chain hydroxyalkane sulfonates, and mixtures of any of the foregoing. Nonlimiting examples of other sulfate or sulfonate detergents are paraffin sulfonates such as the reaction products of alpha olefins and bisulfites (e.g., sodium bisulfite). Also comprised are sulfates of higher alcohols, such as sodium lauryl sulfate, sodium tallow alcohol sulfate, or sulfates of mono-or di-glycerides of fafty acids (e.g., stearic monoglyceride monosulfate), alkyl poly(ethoxy)ether sulfates including, but not limited to, the sulfates of the condensation products of ethylene oxide and lauryl alcohol (usually having 1–5 ethenoxy groups per molecule); lauryl or other higher alkyl glyceryl ether sulfonates; aromatic poly(ethenoxy)ether sulfates including, but not limited to, the sulfates of the condensation products of ethylene oxide and nonyl phenol (usually having 1–20 oxyethylene groups per molecule). Further nonlimiting examples include salts of sulfated aliphatic alcohol, alkyl ether sulfate or alkyl aryl ethoxy sulfate available from Rhone-Poulenc under the general tradename ABEX. Phosphate mono-or di-ester type anionic surface active agents also can be used. These anionic surface active agents are well known in the art and are commercially available under the general trade designation GAFAC from GAF Corporation and under the general trade designation TRITON from Rohm & Haas Company.

Nonlimiting examples of nonionic surface active agents suitable for use in the cured composition or coating of the present invention include those containing ether linkages and which are represented by the following general formula: RO(R'O)$_n$H; wherein the substituent group R represents a hydrocarbon group containing 6 to 60 carbon atoms, the substituent group R' represents an alkylene group containing 2 or 3 carbon atoms, and mixtures of any of the foregoing, and n is an integer ranging from 2 to 100. Such nonionic surface active agents can be prepared by treating fatty alcohols or alkyl-substituted phenols with an excess of ethylene or propylene oxide. The alkyl carbon chain may contain from 14 to 40 carbon atoms and may be derived from a long chain fatty alcohol such as oleyl alcohol or stearyl alcohol. Nonionic polyoxyethylene surface active agents of the type represented by the formula above are commercially available under the general trade designation SURFYNOL® from Air Products Chemicals, Inc.; PLURONIC® or TETRONIC® from BASF Corporation; TERGITOL® from Union Carbide; and SURFONIC® from Huntsman Corporation. Other nonlimiting examples of suitable nonionic surface active agents include block copolymers of ethylene oxide and propylene oxide based on a glycol such as ethylene glycol or propylene glycol including, but not limited to, those available from BASF Corporation under the general trade designation PLURONIC®.

As indicated above, cationic surface active agents also can be used. Nonlimiting examples of cationic surface active agents suitable for use in the compositions of the present invention include acid salts of alkyl amines such as ARMAC® HT, an acetic acid salt of n-alkyl amine available from Akzo Nobel Chemicals; imidazoline derivatives such as CALGENE®C-100 available from Calgene Chemicals Inc.; ethoxylated amines or amides such as DETHOX® Amine C-5, a cocoamine ethoxylate available from Deforest Enterprises; ethoxylated fatty amines such as ETHOX® TAM available from Ethox Chemicals, Inc.; and glyceryl esters such as LEXEMUL® AR, a glyceryl stearate/stearaidoethyl diethylamine available from Inolex Chemical Co.

Other examples of suitable surface active agents can include polyacrylates. Nonlimiting examples of suitable polyacrylates include homopolymers and copolymers of acrylate monomers, for example polybutylacrylate and copolymers derived from acrylate monomers (such as ethyl (meth)acrylate, 2-ethylhexylacrylate, butyl (meth)acrylate and isobutyl acrylate), and hydroxy ethyl(meth)acrylate and (meth)acrylic acid monomers. In one embodiment, the polyacrylate can have amino and hydroxy functionality. Suitable amino and hydroxyl functional acrylates are disclosed in Example 26 below and in U.S. Pat. No. 6,013,733, which is incorporated herein by reference. Another example of a useful amino and hydroxyl functional copolymer is a copolymer of hydroxy ethyl acrylate, 2-ethylhexylacrylate, isobutyl acrylate and dimethylamino ethylmethacrylate. In another embodiment, the polyacrylate can have acid functionality, which can be provided, for example, by including acid functional monomers such as (meth)acrylic acid in the components used to prepare the polyacrylate. In another embodiment, the polyacrylate can have acid functionality and hydroxyl functionality, which can be provided, for example, by including acid functional monomers such as (meth)acrylic acid and hydroxyl functional monomers such as hydroxy ethyl (meth)acrylate in the components used to prepare the polyacrylate.

Suitable flow additives include silicones such as BYK 310 or BYK 307, which are commercially available from Byk-Chemie. Suitable rheology control agents include cellulose acetate butyrate and fumed silicas such as R812 which is commercially available from Degussa Chemical.

In yet another embodiment, the present invention is directed to a coated substrate comprising a substrate and a composition coated over at least a portion of the substrate, wherein the composition is selected from any of the foregoing compositions. In still another embodiment, the present invention is directed to a method of coating a substrate which comprises applying a composition over at least a portion of the substrate, wherein the composition is selected from any of the foregoing compositions. In another embodiment, the present invention is directed to a method of coating a substrate further comprising a step of curing the composition after application to the substrate. The components used to form the compositions in these embodiments can be selected from the components discussed above, and additional components also can be selected from those recited above.

As used herein, a composition "over" at least a portion of a substrate refers to a composition directly applied to at least a portion of the substrate, as well as a composition applied to any coating or adhesion promoter material which was previously applied to at least a portion of the substrate.

The coating compositions of the present invention can be applied over virtually any flexible substrate including plastic, and polymeric substrates such as elastomeric substrates. In one embodiment, the present invention is directed to a coated substrate as previously described wherein the coated substrate is a flexible elastomeric substrate. In still another embodiment, the present invention is directed to coated substrates as previously described wherein the coated substrate is a polymeric substrate. The components used to form the compositions in these embodiments can be selected from the components discussed above, and additional components also can be selected from those recited above.

A further embodiment of the present invention is directed to a coated automobile substrate comprising an automobile substrate and a composition coated over at least a portion of the automobile substrate, wherein the composition is selected from any of the foregoing compositions. In yet another embodiment, the present invention is directed to a method of making a coated automobile substrate comprising providing an automobile substrate and applying over at least a portion of the automotive substrate a composition selected from any of the foregoing compositions. Again, the components used to form the compositions in these embodiments can be selected from the components discussed above, and additional components also can be selected from those recited above.

Suitable polymeric or flexible elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM") and thermoplastic polyurethane ("TPU").

Nonlimiting examples of thermoset materials useful as substrates in connection with the present invention include polyesters, epoxides, phenolics, polyurethanes such as "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

The polymeric substrates described above can have an adhesion promoter present on the surface of the substrate over which the coating compositions of the present invention are applied. To facilitate adhesion of organic coatings to polymeric substrates, the substrate can be pretreated using an adhesion promoter layer or tie coat, e.g., a thin layer 0.25 mils (6.35 microns) thick, or by flame or corona pretreatment.

Suitable adhesion promoters include chlorinated polyolefin adhesion promoters such as are described in U.S. Pat. Nos. 4,997,882; 5,319,032; and 5,397,602, incorporated by reference herein. Other useful adhesion promoting coatings are disclosed in U.S. Pat. No. 6,001,469 (a coating composition containing a saturated polyhydroxylated polydiene polymer having terminal hydroxyl groups), U.S. Pat. No. 5,863,646 (a coating composition having a blend of a saturated polyhydroxylated polydiene polymer and a chlorinated polyolefin) and U.S. Pat. No. 5,135,984 (a coating composition having an adhesion promoting material obtained by reacting a chlorinated polyolefin, maleic acid anhydride, acryl or methacryl modified hydrogenated polybutadiene containing at least one acryloyl group or methacryloyl group per unit molecule, and organic peroxide), which are incorporated herein by reference.

When the substrates are used as components to fabricate automotive vehicles (including, but not limited to, automobiles, trucks and tractors) they can have any shape, and can be selected from the flexible substrates described above. Typical shapes of automotive body components can include body side moldings, fenders, bumpers, and trim for automotive vehicles.

In a further embodiment, the present invention is directed to coated automotive substrates as previously described wherein the coated automotive substrate is a body side molding. In another embodiment, the present invention is directed to coated automotive substrates as previously described wherein the coated automotive substrate is a fender. In another embodiment, the present invention is directed to coated automotive substrates as previously described wherein the coated automotive substrate is a bumper. In another embodiment, the present invention is directed to coated automotive substrates as previously described wherein the coated automotive substrate is trim. The components used to form the compositions used to coat the automotive substrates in these embodiments can be selected from the components discussed above, and additional components also can be selected from those recited above.

In another embodiment, the present invention is directed to multi-component composite coating compositions comprising a basecoat deposited from a pigmented coating composition, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above.

The basecoat and transparent topcoat (i.e., clearcoat) compositions used in the multi-component composite coating compositions of the present invention in certain instances can be formulated into liquid high solids coating compositions, that is, compositions containing 40 percent, or greater than 50 percent by weight resin solids. The solids content can be determined by heating a sample of the composition to 105° C. to 110° C. for 1–2 hours to drive off the volatile material, and subsequently measuring relative weight loss. As aforementioned, although the compositions can be liquid coating compositions, they also can be formulated as powder coating compositions.

The coating composition of the basecoat in the color-plus-clear system can be any of the compositions useful in coatings applications, particularly automotive applications. The coating composition of the basecoat can comprise a resinous binder and a pigment to act as the colorant. Nonlimiting examples of resinous binders are acrylic polymers, polyesters, alkyds, and polyurethanes.

The resinous binders for the basecoat can be organic solvent-based materials such as those described in U.S. Pat. No. 4,220,679, note column 2, line 24 continuing through column 4, line 40, which portions are incorporated by reference. Also, water-based coating compositions such as those described in U.S. Pat. Nos. 4,403,003, 4,147,679 and 5,071,904 can be used as the binder in the basecoat composition. These U.S. patents are incorporated herein by reference.

The basecoat composition can comprise one or more pigments as colorants. Nonlimiting examples of suitable metallic pigments include aluminum flake, copper bronze flake, and metal oxide coated mica.

Besides the metallic pigments, the basecoat compositions can contain nonmetallic color pigments conventionally used in surface coatings such as, for example, inorganic pigments such as titanium dioxide, iron oxide, chromium oxide, lead chromate, and carbon black; and organic pigments such as phthalocyanine blue and phthalocyanine green.

Optional ingredients in the basecoat composition can comprise those which are well known in the art of formulating surface coatings and can comprise surface active agents, flow control agents, thixotropic agents, fillers, anti-gassing agents, organic co-solvents, catalysts, and other customary auxiliaries. Nonlimiting examples of these materials and suitable amounts are described in U.S. Pat. Nos. 4,220,679; 4,403,003; 4,147,769; and 5,071,904, which patents are incorporated herein by reference.

The basecoat compositions can be applied to the substrate by any conventional coating technique such as brushing, spraying, dipping, or flowing. Spray techniques and equipment for air spraying, airless spray, and electrostatic spraying in either manual or automatic methods, known in the art can be used.

During application of the basecoat to the substrate, the film thickness of the basecoat formed on the substrate can range from 0.1 to 5 mils. In another embodiment, the film thickness of the basecoat formed on the substrate can range 0.1 to 1 mils, and can be 0.4 mils.

After forming a film of the basecoat on the substrate, the basecoat can be cured or alternatively given a drying step in which solvent is driven out of the basecoat film by heating or an air drying period before application of the clearcoat. Suitable drying conditions may depend on the particular basecoat composition, and on the ambient humidity if the composition is water-borne, but a drying time from 1 to 15 minutes at a temperature of 75° to 200° F. (21° to 93° C.) can be adequate.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously. Typical curing conditions can range from 50° F. to 475° F. (10° C. to 246° F.) for 1 to 30 minutes. The clearcoating thickness (dry film thickness) can be 1 to 6 mils.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other for example by inhibiting solvent/water evaporation from a lower layer. Moreover, the first topcoat, the second topcoat or both can be the film-forming composition of the present invention. The first transparent topcoat coating composition can be virtually any transparent topcoating composition known to those skilled in the art. The first transparent topcoat composition can be water-borne or solventborne, or, alternatively, in solid particulate form, i.e., a powder coating.

Nonlimiting examples of suitable first topcoating compositions include crosslinkable coating compositions comprising at least one thermosettable coating material and at least one curing agent. Suitable waterborne clearcoats are disclosed in U.S. Pat. No. 5,098,947 (incorporated by reference herein) and are based on water-soluble acrylic resins. Useful solvent borne clearcoats are disclosed in U.S. Pat. Nos. 5,196,485 and 5,814,410 (incorporated by reference herein) and include polyepoxides and polyacid curing agents. Suitable powder clearcoats are described in U.S. Pat. No. 5,663,240 (incorporated by reference herein) and include epoxy functional acrylic copolymers and polycarboxylic acid curing agents.

Typically, after forming the first topcoat over the basecoat, the first topcoat is given a drying step in which solvent is driven out of the film by heating or, alternatively, an air drying period or curing step before application of the second topcoat. Suitable drying conditions will depend on the particular first topcoat composition, and on the ambient humidity if the composition is water-borne, but, in general, a drying time from 1 to 15 minutes at a temperature of 75° F. to 200° F. (21° C. to 93° C.) will be adequate.

The film-forming composition of the present invention when employed as a second topcoat coating composition can be applied as described above for the first topcoat by any conventional coating application technique. Curing conditions can be those described above for the topcoat. The second topcoating dry film thickness can range from 0.1 to 3 mils (7.5 micrometers to 75 micrometers).

It should be mentioned that the coating compositions of the present invention can be advantageously formulated as a "monocoat", that is a coating which forms essentially one coating layer when applied to a substrate. The monocoat coating composition can be pigmented. Nonlimiting examples of suitable pigments include those mentioned above. When employed as a monocoat, the coating compositions of the present invention can be applied (by any of the conventional application techniques discussed above) in two or more successive coats, and, in certain instances can be applied with only an ambient flash period between coats. The multi-coats when cured can form essentially one coating layer.

In another embodiment, the coating compositions of the present invention also can be useful as decorative or protective coatings for pigmented plastic (elastomeric) substrates, such as those described above, or mold-in-color ("MIC") plastic substrates. In these applications, the compositions can be applied directly to the plastic substrate or included in the molding matrix. Optionally, an adhesion promoter can first be applied directly to the plastic or elastomeric substrate and the composition applied as a topcoat thereover, as discussed above. The compositions of the present invention also can be advantageously formulated as pigmented coating compositions for use as primer coatings, as basecoats in multi-component composite coatings, and as monocoat topcoats including pigments or colorants. The components used to form the compositions in these embodiments can be selected from the coating components discussed above, and additional components also can be selected from those recited above.

In embodiments of the present invention directed to automotive applications, the cured compositions can be, for example, the electrodeposition coating, the primer coating, the basecoat, and/or the topcoat. Suitable topcoats include monocoats and basecoat/clearcoat composites. Monocoats are formed from one or more layers of a colored coating composition. Basecoat/clearcoat composites comprise one or more layers of a colored basecoat composition, and one or more layers of a clearcoating composition, wherein the basecoat composition has at least one component which is different from the clearcoat composition. In the embodiments of the present invention directed to automotive applications, the clearcoat can be transparent after application.

In another embodiment, the present invention is directed to a method for making a multi-component composite comprising (a) applying a pigmented composition to a substrate to form a basecoat; and (b) applying a topcoating composition over at least a portion of the basecoat to form a topcoat thereon, wherein the topcoating composition is selected from any of the compositions described above. The components used to form the topcoating composition in this embodiment can be selected from the coating components discussed above, and additional components also can be selected from those recited above.

The coatings formed from the compositions according to the present invention can have outstanding appearance properties and initial scratch (mar) resistance properties, as well as post-weathering or "retained" scratch (mar) resistance, which can be evaluated by measuring the gloss of coated substrates before and after abrading of the coated substrates.

In one embodiment, the present invention is directed to methods of improving the scratch resistance of a polymeric substrate or polymer coated substrate comprising applying to at least a portion of the substrate any of the previously described inventive compositions, and curing the composition to form a cured coating on the substrate.

In another embodiment, the present invention is directed to a method for retaining the gloss of a polymeric substrate or polymer coated substrate after a predetermined period of time comprising applying to the substrate comprising any of the inventive compositions described for the substrate. This predetermined period of time can generally be at least 6 months and can be at least one year. In another embodiment, the present invention is directed to a method for revitalizing the gloss of a polymeric substrate or polymer coated substrate comprising applying to the substrate any of the inventive compositions described above.

The initial 20° gloss of a cured coated substrate according to the present invention can be measured with a 20° NOVO-GLOSS 20 statistical glossmeter, available from Gardner Instrument Company, Inc. The coated substrate can be subjected to scratch testing by linearly scratching the coating or substrate with a weighted abrasive paper for ten double rubs using an Atlas AATCC Scratch Tester, Model CM-5, available from Atlas Electrical Devices Company of Chicago, Ill. The abrasive paper is 3M 281Q WETORDRY™ PRODUCTION™ 9 micron polishing paper sheets, which are commercially available from 3M Company of St. Paul, Minn. Panels are then rinsed with tap water and carefully patted dry with a paper towel. The 20° gloss is measured on the scratched area of each test panel. The number reported is the percent of the initial gloss retained after scratch testing, i.e., 100% X scratched gloss/initial gloss. This test method is fully disclosed in the examples that follow.

In certain embodiments, the cured composition or coating of the present invention has an initial 20° gloss (as measured using a 20° NOVO-GLOSS 20 statistical glossmeter, available from Gardner Instrument Company) of greater than 40, can be greater than 50, and is often greater than 70. This high gloss composition can be curable under ambient or thermal conditions or by radiation curing techniques, for example, by actinic radiation. In one embodiment, the high gloss composition is curable by ambient or thermal conditions.

Moreover, the cured topcoat formed from the compositions of the present invention can exhibit excellent initial scratch (mar) resistance, as well as post-weathering scratch (mar) resistance properties. The cured topcoat can have an initial scratch (mar) resistance value (as measured by first determining the initial 20° gloss as described above, linearly abrading the cured coating surface with a weighted abrasive paper for ten double rubs using an Atlas AATCC Scratch Tester, Model CM-5, available from Atlas Electrical Devices Company, and measuring the 20° gloss as described above for the abraded surface) such that after scratch (mar) testing greater than 30 percent of initial 20° gloss is retained, in certain instances greater than 40 percent of initial 20° gloss is retained, and in other instances greater than 60 percent of initial 20° gloss is retained after abrading the coating surface (that is, 100%×scratched gloss/initial gloss).

Also, the cured topcoat formed from the compositions of the present invention can have a post-weathering scratch (mar) resistance (as measured using the scratch test method described above after the unscratched test panels were subjected to simulated weathering by QUV exposure to UVA-340 bulbs in a weathering cabinet available from Q Panel Company) such that greater than 30 percent of initial 20° gloss is retained is retained after weathering for 250 hours. In another embodiment, greater than 50 percent of initial 20° gloss is retained, an often greater than 70 percent of initial 20° gloss is retained after weathering for 250 hours.

The compositions of the present invention can advantageously be used to form the transparent topcoat (i.e., clearcoat) in a cured multi-component composite coating comprising a basecoat deposited from a pigmented coating composition and the topcoat deposited from a topcoat coating composition. As used herein, "transparent" means that the cured coating has a BYK Haze index of less than 50 as measured using a BYK Haze/Gloss Instrument. When so employed, the cured topcoat can be deposited from any of the previously described compositions of the present invention.

The coating compositions of the present invention can provide flexible cured coatings. Flexibility testing can be conducted according to the following "Flexibility Test Method." The coating is applied to a flexible polymeric test panel and cured. For flex testing, a 1-inch by 4-inch piece is cut from the coated test panel. At a temperature of 70° F. (21° C.)±5° F., the piece is subjected to a mandrel bend using a ½ inch diameter steel mandrel, such that the two ends of the 4-inch long test piece contacted one another. The test panel is then rated for flexibility by visual inspection for coating cracking on a scale of 0 to 10. A "10" rating is recorded where there is no visible paint cracking; a "9" rating has less than five interrupted short line cracks; an "8" has interrupted line cracks with a maximum of four uninterrupted line cracks; a "6" has five to ten uninterrupted line cracks; a "4" has more than 15 uninterrupted line cracks; and a "0" represents fracture of the substrate. In one embodiment, the coating compositions when cured have a flexibility rating of at least 6 at 70° F. In another embodiment, the coating compositions when cured have a flexibility rating of at least 8 at 70° F., while in yet another embodiment, the coating compositions when cured have a flexibility rating of at least 9 at 70° F.

Illustrating the invention are the following examples which, however, are not to be considered as limiting the invention to their details. Unless otherwise indicated, all parts and percentages in the following examples, as well as throughout the specification, are by weight.

EXAMPLES

Film-forming Composition 1:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains a hydroxyl functional group-containing polysiloxane and inorganic microparticles in the form of a colloidal silica. The film-forming composition was prepared from a mixture of the following ingredients under agitation in the order which they appear:

| Ingredients | Resin Solids | Silica Solids | Weight in Grams |
|---|---|---|---|
| 2-Methoxy propyl acetate | | | 2.7 |
| Methyl amyl ketone | | | 40.0 |
| TINUVIN 928[1] | 3.0 | | 3.0 |
| TINUVIN 123[2] | 0.5 | | 0.5 |
| Carbamate functional acrylic[3] | 21.5 | | 33.6 |
| Carbamate functional polyester[4] | 21.5 | | 30.7 |
| Carbamate functional polyether[5] | 10.0 | | 10.3 |
| Silica dispersion[6] | 7.0 | 3.0 | 12.8 |
| RESIMENE 757[7] | 40.0 | | 41.2 |
| Flow additive[8] | 0.3 | | 0.5 |
| Catalyst solution[9] | 1.0 | | 2.5 |

[1]UV absorber available from Ciba Geigy Corp.
[2]Hindered amine light stabilizer available from Ciba Geigy Corp.
[3]Carbamate functional acrylic resin prepared as follows: To a suitable flask was added 3652.5 g of 90% acrylic polyol solution (40% HPA, 58% BMA, 2% methyl styrene dimer) in 1-methoxy-2-propanol, 2836.2 grams of a 38% solution of 1-methoxy-2-propyl carbamate in 1-methoxy-2-propanol, 25.0 grams of 1-methoxy-2-propanol, 9.6 grams triphenyl phosphite, and 2.4 grams butyl stannoic acid. The materials were mixed and then transferred over a period of 7.3 hours into a reactor vessel suitable for vacuum distillation. During the transfer, the temperature of the reactor was held between 131° and 139° C., and reduced pressure was maintained to ensure steady distillation of 1-methoxy-2-propanol. Upon completion of the transfer, the pressure was gradually reduced to maintain distillation until a final pressure of 41 mm Hg was reached. When distillation was completed, the resulting resin was cooled and thinned with 925 g 1-methoxy-2-propanol and 950 g ethyl 3-ethoxypropionate. Prior to thinning, the resin had a measured hydroxyl value of 40.8. After thinning, the resin had a measured solids content of 63%, a weight average molecular weight of 9107, and a number average molecular weight of 3645 as determined by gel permeation chromatography vs. a polystyrene standard.
[4]Carbamate functional polyester prepared as follows: A polyester was prepared from 2,2,4-trimethyl-1,3-pentanediol/trimethylolpropane/neopentyl glycol/hexahydrophthalic anhydride (22.7/10.6/17.5/49.2 weight ratio) with a resulting hydroxyl value of 146 and at 100% solids. To a reactor equipped with a thermocouple, overhead stirrer, nitrogen inlet, and reflux condenser was added 375.1 parts by weight of the polyester, 71.9 parts methyl carbamate, 1.0 parts butyl stannoic acid, 0.8 parts triphenyl phosphite, and 35.0 parts 2-methoxy-1-propanol. The contents were heated to reflux under nitrogen blanket at 141° C. and held for 1 hour. Then, the reflux condenser was removed and the reactor equipped for distillation at atmospheric pressure. The temperature was gradually increased to 151° C. until 28.7 parts of distillate were collected. The mixture was then cooled to 145° C. and the reactor equipped for vacuum distillation. Distillation continued under reduced pressure until 60 mmHg was attained. A total distillate of 78.3 parts was collected. The resulting resin hydroxy value was 33.8 at 100% solids. The resin was cooled and diluted with 140 parts 2-methoxy-1-propanol. The final resin solution was 72.2% solids with a weight average molecular weight of 2197 and number average molecular weight of 1202 as determined by Gel Permeation Chromatography using a polystyrene standard.
[5]Example B of U.S. Pat. No. 5,663,244, which is incorporated by reference herein.
[6]Silica dispersion: A 4-neck reaction flask equipped for vacuum distillation was flushed with $N_2$.
To the reaction flask was added 1051.1 g of siloxane polyol, 1125.8 of Organosilicasol MT-ST-M colloidal silica from Nissan Chemicals and 480.3 g of methyl amyl ketone. The resulting mixture was vacuum distilled at 25° C. for 4 h. The siloxane polyol was a product of the hydrosilylation of pentasiloxane with an approximate degree of polymerization of 3 to 4, i.e., (Si—O)$_3$ to (Si—O)$_4$. The polysiloxane polyol was prepared from the following mixture of ingredients:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | .07 |

[1]Polysiloxane-containing silicon hydride, commercially available from BASF Corporation.
[2]Equivalent weight based on mercuric bichloride determination.
To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket.
At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C.
After completion of this addition, the reaction temperature was maintained at 95° C. and monitored by infrared spectroscopy for disappearance of the silicon hydride absorption band (Si—H, 2150 cm$^{-1}$).
[7]Aminoplast resin available from Solutia Chemical.
[8]Solution of polybutylacrylate (Mw = 6700, Mn = 2600) in xylene
[9]Solution of 72.9 g Dodecylbenzene sulfonic acid/27.1 g diisopropanol amine/51.1 g ethanol/31.2 g isopropanol.

Film-forming Composition 2:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains both aminoplast and polyisocyanate curing agents, hydroxyl functional group-containing polysiloxane and inorganic microparticles in the form of a colloidal silica. The film-forming composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 11.9 |
| Silica dispersion from footnote 6 of Film-Forming Composition 1 above | 4.7 | 2.0 | 8.6 |
| TINUVIN 928 | 3.0 | | 3.0 |
| CYMEL 202[1] | 15.0 | | 18.8 |
| Acrylic polyol[2] | 23.6 | | 47.2 |
| Polyester polyol[3] | 20.3 | | 25.3 |
| Hydroxyl containing polysiloxane of silica dispersion from footnote 6 of Film-Forming Composition 1 above | 10.4 | | 10.4 |
| TINUVIN 292[4] | 0.5 | | 0.5 |
| Flow additive of Film-Forming Composition 1 above | 0.3 | | 0.5 |
| The following two ingredients were added to the above mixture immediately prior to application of the coating: | | | |
| DESMODUR N-3390 | 26.0 | | 28.9 |
| Catalyst[5] | 1.0 | | 1.3 |

[1]Aminoplast resin available from Cytec Industries
[2]Acrylic polyol: (34.8% HEMA/23.4% 2-EHMA/20.8% 2-EHA/20% Styrene/1% MAA), 51% in 1:1 xylene/butyl acetate, weight average molecular weight = 7200, number average molecular weight = 2850 based on gel permeation chromatography using polystyrene standard.
[3]Polyester polyol: (32% 4-methyl hexahydrophthalic anhydride/22.9% 1,6 hexane diol/18.6% trimethylol propane/18.4% adipic acid/8.1% trimethyl pentane diol), 80% in 60:40 butyl acetate/Solvesso 100, hydroxy value = 145, Gardner-Holt viscosity = X – Z
[4]Hindered amine light stabilizer available from Ciba-Geigy Corp.
[5]Solution of Phenyl Acid Phosphate in n-butyl alcohol Test Panel Preparation:

MPP4100D, adhesion promoter commercially available for PPG Industries, Inc., was applied to Sequel 1440 TPO plaques, commercially available from Standard Plaque (4 inches×12 inches), by hand spraying at a dry film thickness of 0.15 mils to 0.25 mils (3.8 microns to 6.4 microns). Each Sequel 1440 plaque was cleaned with isopropyl alcohol prior to being coated with the adhesion promoter. The coated Sequel 1440 plaques sat for one day before a solventborne black basecoat commercially available from PPG Industries, Inc., either CBCK8555A (used in conjunction with 2K clearcoats) or CBC8555T (used in conjunction with 1 K clearcoats), was applied at a dry film thickness of 0.8 mils to 1.0 mils (20.3 microns to 25.4 microns). CBCK8555A and CBC8555T were applied by SPRAYMATION in two coats with a 90 second "flash" at ambient temperatures between each coat. The basecoated panels sat at ambient temperature for 90 seconds before Film-Forming Compositions 1 and 2 described above were applied by SPRAYMATION in two coats with a 90 second ambient flash between each coat. The transparent topcoats had a dry film thickness between 1.6 mils and 1.8 mils (40.6 microns to 45.7 microns). The top coated panels were allowed to sit at ambient temperature for 10 minutes and then were thermally cured at 254° F. for 40 minutes. The coated test panels sat at ambient temperature for four days prior to testing.

The test panels coated with Film-Forming Compositions 1 and 2 were subjected to the test methods described earlier for 20° Gloss, scratch testing, and scratch testing after weathering. The weathering was performed for 250 hours in a QUV cabinet available from Q-Panel Co. The cabinet was equipped with UV340 bulbs, with a light cycle temperature of 70° C. and condensation cycle temperature of 50° C. The cabinet's cycles were set to alternate between 4 hours of condensation and eight hours of UV exposure. Additionally, the coated test panels were tested for flexibility at 70° F. For flex testing, a 1 inch by 4 inch piece was cut from the coated test panel. The piece was subjected to a bend around a ½ inch diameter steel mandrel, such that the two ends of the 4 inch long test piece contacted one another. The visual rating scale ranged from 0 to 10. For a panel rated '10' no paint cracking was visible. A '9' had less than five interrupted short line cracks. An '8' had interrupted line cracks with a maximum of four uninterrupted line cracks. A '6' had five to ten uninterrupted line cracks. A '4' had more than 15 uninterrupted line cracks. A '0' is fracture of the substrate.

| EXAMPLE | 20° Gloss | % 20° Gloss After Scratch Test | % 20° Gloss After Post-Weathering | Flexibility |
|---|---|---|---|---|
| Film-Forming Composition 1 | 86 | 83 | 55 | 8 |
| Commercial Flexible 1K Clear[1] | 88 | 46 | 11 | 8 |
| Film-Forming Composition 2 | 85 | 69 | 35 | 10 |
| Commercial Flexible 2K Clear[2] | 87 | 17 | 8 | 9 |

[1]UDC-1000 flexible 1 component carbamate containing clearcoat available from PPG Industries, Inc.
[2]TKU-2000 flexible 2 component isocyanate containing clearcoat available from PPG Industries, Inc.

Film-forming Composition 3:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains both aminoplast and polyisocyanate curing agents, hydroxyl functional group-containing polysiloxane, flexible polyester polyol, and an acrylic polyol film forming resin. The film-forming composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 24.0 |
| TINUVIN 928 | 3.0 | | 3.0 |
| CYMEL 202 | 10.0 | | 12.5 |
| Acrylic polyol of footnote 2 of Film-Forming Composition 2 above | 20.2 | | 33.7 |
| Polyester polyol of footnote 3 of Film-Forming Composition 2 above | 30.0 | | 37.4 |
| Hydroxyl containing polysiloxane of silica dispersion from footnote 6 of Film-Forming Composition 1 above | 10.0 | | 10.0 |

-continued

| Ingredients | Resin Solids | Silica Solids | Weight in Grams |
|---|---|---|---|
| TINUVIN 292 | 0.5 | | 0.5 |
| BYK 310 Solution[1] | 0.05 | | 0.24 |
| BYK 307 Solution[2] | 0.03 | | 0.13 |
| The following two ingredients were added to the above mixture immediately prior to application of the coating: | | | |
| DESMODUR N-3390 | 29.8 | | 33.1 |
| Phenyl acid phosphate solution | 1.0 | | 1.3 |

[1]Surface tension modifier available from Byk-Chemie USA at 15% solids in 2-methoxy propyl acetate
[2]Surface tension modifier available from Byk-Chemie USA at 25% solids in 2-methoxy propyl acetate Film-forming Composition 4:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains both aminoplast and polyisocyanate curing agents, hydroxyl functional group-containing polysiloxane, flexible polyether polyol, and an acrylic polyol film forming resin. The film-forming composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 16.4 |
| TINUVIN 928 | 3.0 | | 3.0 |
| CYMEL 1130[1] | 10.0 | | 10.0 |
| Acrylic polyol of footnote 2 of Film-Forming Composition 2 | 41 | | 68.3 |
| Polyether polyol[2] | 12 | | 12 |
| Hydroxyl containing polysiloxane of silica dispersion from footnote 6 of Film-Forming Composition 1 above | 10 | | 10 |
| TINUVIN 292 | 0.5 | | 0.5 |
| BYK 310 Solution | 0.05 | | 0.24 |
| BYK 307 Solution | 0.03 | | 0.13 |
| The following two ingredients were added to the above mixture immediately prior to application of the coating: | | | |
| DESMODUR N-3390 | 27.0 | | 30.0 |
| Catalyst Solution[3] | 1.0 | | 1.4 |

[1]Aminoplast resin available from Cytec Industries
[2]Terathane 1000 available from DuPont
[3]Solution of Dodecyl benzene sulfonic acid in isopropyl alcohol Film-forming Composition 5:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains both aminoplast and polyisocyanate curing agents, hydroxyl functional group-containing polysiloxane, flexible polyether polyol, and an acrylic polyol film forming resin. The film-forming composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 13.9 |
| TINUVIN 928 | 3.0 | | 3.0 |
| CYMEL 1130 | 10.0 | | 10.0 |
| Acrylic polyol of footnote 2 of Film-Forming Composition 2 | 41 | | 68.3 |
| Polyether polyol of footnote 2 of Film-Forming Composition 4 | 12 | | 12 |
| Hydroxyl containing polysiloxane of silica dispersion of footnote 6 of Film-Forming Composition 1 above | 10 | | 10 |
| TINUVIN 292 | 0.5 | | 0.5 |
| Flow additive of footnote 8 of Film-Forming Composition 1 above | 0.3 | | 0.5 |
| The following two ingredients were added to the above mixture immediately prior to application of the coating: | | | |
| DESMODUR N-3390 | 27.0 | | 30.0 |
| Catalyst solution of footnote 3 of Film-Forming Composition 4 | 1.0 | | 1.4 |

Film-forming Composition 6:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains both aminoplast and polyisocyanate curing agents, hydroxyl functional group-containing polysiloxane, flexible polyester polyol, and an acrylic polyol film forming resin. The film-forming composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 23.1 |
| TINUVIN 928 | 3.0 | | 3.0 |
| CYMEL 1130 | 10.0 | | 10.0 |
| Acrylic polyol of footnote 2 of Film-Forming Composition 2 | 32.1 | | 53.5 |
| Polyester polyol[1] | 21 | | 23.3 |
| Hydroxyl containing polysiloxane of silica dispersion of footnote 6 of Film-Forming Composition 1 above | 10 | | 10 |
| TINUVIN 292 | 0.5 | | 0.5 |
| BYK 310 solution | 0.05 | | 0.24 |
| BYK 307 solution | 0.03 | | 0.13 |
| The following two ingredients were added to the above mixture immediately prior to application of the coating: | | | |
| DESMODUR N-3390 | 26.9 | | 29.9 |
| Catalyst solution of footnote 3 of Film-Forming Composition 4 | 1.0 | | 1.4 |

[1]Polyester polyol: (49.4% hexane diol/19.6% adipic acid/31.0% hexahydrophthalic anhydride); 90% solids in methyl n-amyl ketone; solution hydroxyl value = 105; solution acid value = 8; Gardner-Holt viscosity = U − V Film-forming Composition 7:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains polyisocyanate curing agent, hydroxyl functional group-containing polysiloxane, flexible polyether polyol, and an acrylic polyol film forming resin. The film-forming composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 16.4 |
| TINUVIN 928 | 3.0 | | 3.0 |
| Acrylic polyol of footnote 2 of Film-Forming Composition 2 | 37.2 | | 62.0 |
| Polyether polyol of footnote 2 of Film-Forming Composition 4 | 12 | | 12 |
| Hydroxyl containing polysiloxane of silica dispersion of footnote 6 of Film-Forming Composition 1 above | 10 | | 10 |
| TINUVIN 292 | 0.5 | | 0.5 |
| BYK 310 Solution | 0.05 | | 0.24 |
| BYK 307 Solution | 0.03 | | 0.13 |
| The following two ingredients were added to the above mixture immediately prior to application of the coating: | | | |
| DESMODUR N-3390 | 36.2 | | 40.2 |
| Catalyst solution of footnote 3 of Film-Forming Composition 4 | 1.0 | | 1.4 |

Film-forming Composition 8:

This example describes the preparation of a film-forming composition used to form the transparent topcoat in a multi-component composite composition of the present invention. In an alternative embodiment of the present invention, the composition may be used to form a transparent topcoat on a pigmented plastic substrate or a pigmented plastic substrate coated with a clear primer or adhesion promoter. The film forming composition contains both aminoplast and polyisocyanate curing agents, hydroxyl functional group-containing polysiloxane, and an acrylic polyol film forming resin. The film-forming composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 16.4 |
| TINUVIN 928 | 3.0 | | 3.0 |
| CYMEL 1130 | 10.0 | | 10.0 |
| Acrylic polyol of footnote 2 of Film-Forming Composition 2 | 48.3 | | 80.4 |
| Hydroxyl containing polysiloxane of silica dispersion of footnote 6 of Film-Forming Composition 1 above | 10 | | 10 |
| TINUVIN 292 | 0.5 | | 0.5 |
| BYK 310 Solution | 0.05 | | 0.24 |
| BYK 307 Solution | 0.03 | | 0.13 |
| The following two ingredients were added to the above mixture immediately prior to application of the coating: | | | |
| DESMODUR N-3390 | 27.2 | | 30.2 |
| Catalyst solution of footnote 3 of Film-Forming Composition 4 | 1.0 | | 1.4 |

Test Panel Preparation:

Sequel 1440 TPO plaques were cleaned and coated with adhesion promoter and basecoat as set forth in Example 3 above. Film-Forming Compositions 3–8 described above were spray applied as clearcoats as set forth in Example 3 above. The test panels coated with Film-Forming Compositions 3–8 were subjected to the test methods described earlier for 20° Gloss, scratch testing, and flexiblity. The test results are reported in the table below.

| EXAMPLE | 20° Gloss (Initial) | % Initial 20° gloss retained after mar/ scratch test | Flexibility Rating |
|---|---|---|---|
| Film-Forming Composition 3 | 87 | 61 | 10 |
| Film-Forming Composition 4 | 87 | 72 | 8 |
| Film-Forming Composition 5 | 88 | 80 | 8 |
| Film-Forming Composition 6 | 87 | 80 | 9 |
| Film-Forming Composition 7 | 83 | 67 | 9 |
| Film-Forming Composition 8 | 85 | 52 | 6 |

Therefore we claim:

1. A cured coating formed from a coating composition formed from components comprising:
    (a) at least one polysiloxane comprising at least two reactive functional groups, the at least one polysiloxane comprising at least one of the following structural units (I):

$$R^1{}_n R^2{}_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2 \leq (m+n)<4$;
    (b) at least one reactant comprising at least one functional group that is reactive with at least one reactive functional group of (a), provided, when said at least one reactant (b) comprises at least one polyol, said polyol has a hydroxyl value ranging from 100 to less than 200,
    wherein each component is different,
    wherein the curec coating has a flexibility rating according to a Flexibility Test Method of at least 6 at a temperature of 70° F., and
    wherein the cured coating has an initial scratch resistance value such that after scratch testing greater than 40 percent of initial 20° gloss is retained.

2. A cured coating formed from a composition according to claim 1, wherein each $R^2$, which may be identical or different, represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

3. A cured coating according to claim 1, wherein at least one $R^2$ group represents a group comprising at least one reactive functional group selected from a hydroxyl group and a carbamate group.

4. A cured coating according to claim 3, wherein at least one $R^2$ group represents a group comprising at least two reactive functional groups selected from a hydroxyl group and a carbamate group.

5. A cured coating according to claim 1, wherein at least one $R^2$ group represents a group comprising an oxyalkylene group and at least two hydroxyl groups.

6. A cured coating according to claim 1, wherein the at least one polysiloxane has the following structure (II) or (III):

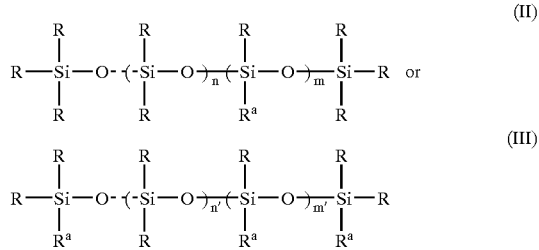

wherein:

m has a value of at least 1;

m' ranges from 0 to 75;

n ranges from 0 to 75;

n' ranges from 0 to 75;

each R, which may be identical or different, is selected from H, OH, monovalent hydrocarbon groups, monovalent siloxane groups, and mixtures of any of the foregoing; and $R^a$ comprises the following stwcture (IV):

wherein $—R^3$ is selected from an alkylene group, an oxyalkylene group, an alkylene aryl group, an alkenylene group, an oxyalkenylene group, and an alkenylene aryl group; and X represents a group which comprises at least one reactive functional group.

7. A cured coating according to claim 6, wherein (n+m) ranges from 2 to 9.

8. A cured coating according to claim 7, wherein (n+m) ranges from 2 to 3.

9. A cured coating according to claim 6, wherein (n'+m') ranges from 2 to 9.

10. A cured coating according to claim 9. wherein (n'+in') ranges from 2 to 3.

11. A cured coating according to claim 6, wherein X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

12. A cured coating according to claim 11, wherein X represents a group comprising at least one reactive functional group selected from a hydroxyl group and a carbamate group.

13. A cured coating according to claim 11, wherein X represents a group comprising at least two hydroxyl groups.

14. A cured coating according to claim 1, wherein the at least one polysiloxane (a), when added to the other components that form the composition, is present in the composition in an amount ranging from 0.01 to 90 weight percent based on total weight of resin solids of the components from which the composition is formed.

15. A cured coating according to claim 14, wherein the at least one polysiloxane (a) is present in an amount of at least 2 weight percent.

16. A cured coating according to claim 15, wherein the at least one polysiloxane (a) is present in an amount of at least 5 weight percent.

17. A cured coating according to claim 16, wherein the at least one polysiloxane (a) is present in an amount of at least 10 weight percent.

18. A cured coating according to claim 1, wherein the at least one polyol is selected from polyether polyols, polyester polyols, acrylic polyols, and polyurethane polyols.

19. A cured coating according to claim 18, wherein the polyol comprises at least one polyalkylene oxide polyol.

20. A cured coating according to claim 18, wherein the polyol further comprises at least one reactive functional group other than a hydroxyl group.

21. A cured coating according to claim 20, wherein the at least one reactive functional group of the polyol comprises a carbamate functional group.

22. A cured coating according to claim 1, wherein the at least one polyol, when added to the other components that form the composition, is present in the composition in an amount ranging from 0.1 to 30 weight percent based on total weight of resin solids of the components from which the composition is formed.

23. A cured coating according to claim 22, wherein the at least one polyol, when added to the other components that form the composition, is present In an amount ranging from 5 to 20 weight percent based on total weight of resin solids of the components from which the composition is formed.

24. A cured coating according to claim 1, wherein the at least one reactant is selected from at least one curing agent.

25. A cured coating according to claim 20, wherein the at least one curing agent is selected from an aminoplast resin, a polyisocyanate, a blocked polyisocyanate compound, a polyepoxide, a polyacid, and a polyol.

26. A cured coating according to claim 25, wherein the at least one curing agent comprises a polyisocyanate.

27. A cured coating according to claim 25, wherein the at least one curing agent comprises a mixture of a polyisocyanate and an aminoplast resin.

28. A cured coating according to claim 24, wherein the curing agent, when added to the other components that form the composition, is present in an amount ranging from 5 to 40 weight percent based on total weight of resin solids of the components from which the composition is formed.

29. A cured coating according to claim 1, wherein the components from which the coating composition is formed comprise at least one film-forming material.

30. A cured coating according to claim 29, wherein the at least one film-forming material is selected from at least one additional polymer, in addition to and different from the at least one polysiloxane (a) and the at least one polyol (b), comprising at least one reactive functional group.

31. A cured coating according to claim 29, wherein the at least one additional polymer comprises at least one reactive functional group selected from a hydroxyl group, a carbamate group, an epoxy group, an isocyanate group, and a carboxyl group.

32. A cured coating according to claim 1, wherein the components from which the composition is formed comprise at least one material which has at least one reactive functional group which is blocked with a silyl group.

33. A cured coating according to claim 32, wherein the silyl blocking group has the following structure (IX):

wherein each $R_1$, $R_2$ and $R_3$, which may be identical or different, represents hydrogen, an alkyl group having from 1 to 18 carbon atoms, phenyl or allyl.

34. A cured coating according to claim 32, wherein the at least one reactive functional group is selected from a hydroxyl group, a carbamate group, a carboxyl group, and an amide group.

35. A cured coating according to claim 32, comprising at least one compound which can be reacted with the functional group to form the silyl group, wherein the at least one compound is selected from hexamethyldisilazane, trimethylchlorosilane, trimethylsilyldiethylamine, t-butyl dimethylsilyl chloride, diphenyl methylsilyl chloride, hexamethyl disilylazide, hexamethyl disiloxane, trimethylsilyl triflate, hexamethyldisilyl acetamide and mixtures of any of the foregoing.

36. A cured coating according to claim 32, wherein the at least one reactant has a backbone which comprises at least one linkage selected from an ester linkage, a urethane linkage, a urea linkage, an amide linkage, a siloxane linkage, and an ether linkage or at least one polymer selected from a polyester polymer, an acrylic polymer, a polyurethane, a polyether, a polyurea, a polyamide, and copolymers of any of the foregoing.

37. A cured coating according to claim 32, wherein the reactant comprises at least one compound having the following structure (X):

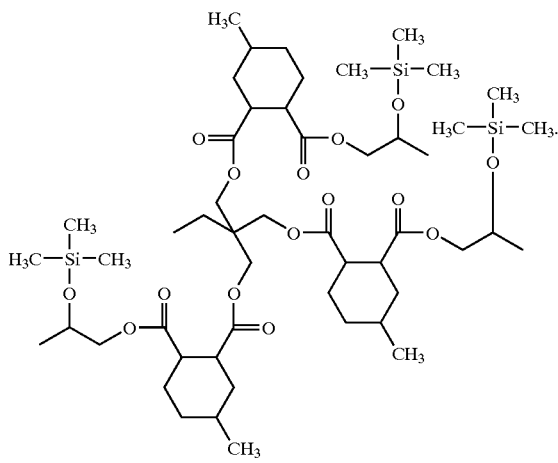

38. A cured coating according to claim 1, wherein the components from which the coating composition is formed further comprise at least one adjuvant surface active agent selected from an anionic surface active agent, a cationic surface active agent and a nonionic surface active agent.

39. A cured coating according to claim 1, wherein the components from which the coating composition is formed further comprise at least one catalyst.

40. A cured coating according to claim 39, wherein the at least one catalyst is selected from at least one acid functional catalyst.

41. A cured coating according to claim 40, wherein the at least one acid functional catalyst is selected from an acid phosphate, a substituted sulfonic acid and an unsubstituted sulfonic acid.

42. A cured coating according to claim 41, wherein the at least one acid functional catalyst is selected from phenyl acid phosphate and dodecylbenzene sulfonic acid.

43. A cured coating according to claim 1, wherein the components from which the coating composition is formed further comprise a plurality of particles which are different from components (a), (b) and (c).

44. A cured coating according to claim 43, wherein the plurality of particles are selected from inorganic particles, composite particles, and mixtures thereof.

45. A cured coating according to claim 43, wherein the particles are selected from fumed silica, amorphous silica, colloidal silica, alumina, colloidal alumina, titanium dioxide, cesium oxide, yttrium oxide, colloidal yttria, zirconia, colloidal zirconia and mixtures of any of the foregoing.

46. A cured coating according to claim 45, wherein the particles include colloidal silica.

47. A cured coating according to claim 43, wherein the particles are surface treated.

48. A cured coating according to claim 43, wherein the particles have an average particle size of less than 100 microns prior to incorporation into the composition.

49. A cured coating according to claim 43, wherein the particles have an average particle size ranging from 1 to less than 1000 nanometers prior to incorporation into the composition.

50. A cured coating according to claim 49, wherein the particles have an average particle size ranging from 1 to 100 nanometers prior to incorporation into the composition.

51. A cured coating according to claim 50, wherein the particles have an average particle size ranging from 5 to 50 nanometers prior to incorporation into the composition.

52. A cured coating according to claim 43, wherein the particles, when added to the other components that form the composition, are present in the composition in an amount ranging from 0.01 to 75 weight percent based on total weight of the resin solids of the components from which the composition is formed.

53. A cured coating according to claim 52, wherein the particles are present in an amount of at least 0.1 weight percent.

54. A cured coating according to claim 53, wherein the particles are present in an amount of at least 0.5 weight percent.

55. A cured coating according to claim 54, wherein the particles are present in an amount of at least 5 weight percent.

56. A cured coating according to claim 52, wherein the particles are present in an amount of less than 50 weight percent.

57. A cured coating according to claim 56, wherein the particles are present in an amount of less than 20 weight percent.

58. A cured coating according to claim 56, wherein the particles are present in an amount of less than 10 weight percent.

59. A cured coating according to claim 1, wherein the cured coating has a flexibility of at least 8 at a temperature of 70° F.

60. A cured coating according to claim 59, wherein the cured coating has a flexibility of at least 9 at a temperature of 70° F.

61. A cured coating according to claim 1, wherein the cured coating has a glass transition temperature ranging from −20° C. to 100° c.

62. A cured coating according to claim 61, wherein the cured coating has a glass transition temperature ranging from 40° C. to 90° C.

63. A cured coating according to claim 1, wherein the cured coating has an initial scratch resistance value such that after scratch testing greater than 50 percent of the initial 20° gloss is retained.

64. A cured coating according to claim 1, wherein the coating is thermally cured.

65. A cured coating according to claim 1, wherein the cured coating is cured by exposure to ionizing radiation.

66. A cured coating according to claim 1, wherein the cured coating is cured by exposure to actinic radiation.

67. A cured coating according to claim 1, wherein the cured coating is cured by exposure to (1) ionizing radiation or actinic radiation and (2) thermal energy.

* * * * *